United States Patent
Young

(10) Patent No.: US 7,592,921 B2
(45) Date of Patent: Sep. 22, 2009

(54) APPARATUS FOR FLOW DETECTION, MEASUREMENT AND CONTROL AND METHOD FOR USE OF SAME

(76) Inventor: Richard Young, 13316 Hickory Hill Rd., Arcadia, OK (US) 73007

( * ) Notice: Subject to any disclaimer, the term of this patent is extended or adjusted under 35 U.S.C. 154(b) by 0 days.

(21) Appl. No.: 11/804,957

(22) Filed: May 21, 2007

(65) Prior Publication Data

US 2008/0224877 A1   Sep. 18, 2008

Related U.S. Application Data

(63) Continuation of application No. 11/174,242, filed on Jul. 1, 2005, which is a continuation-in-part of application No. 10/880,123, filed on Jun. 30, 2004, now Pat. No. 7,221,281, which is a continuation-in-part of application No. 10/118,207, filed on Apr. 9, 2002, now Pat. No. 6,914,531, which is a continuation-in-part of application No. 09/993,537, filed on Nov. 6, 2001, now Pat. No. 6,741,179, which is a continuation-in-part of application No. 09/567,510, filed on May 8, 2000, now Pat. No. 6,333,695, which is a continuation-in-part of application No. 09/483,999, filed on Jan. 18, 2000, now Pat. No. 6,239,708, which is a continuation-in-part of application No. 09/098,976, filed on Jun. 17, 1998, now Pat. No. 6,081,196.

(51) Int. Cl.
G08B 21/00 (2006.01)

(52) U.S. Cl. .................. 340/606; 340/611; 340/618

(58) Field of Classification Search .................. 340/605, 340/606, 607, 608, 609, 610, 611, 618; 73/242, 73/251, 273, 861.58; 137/624.11, 870
See application file for complete search history.

(56) References Cited

U.S. PATENT DOCUMENTS

| | | |
|---|---|---|
| 3,762,442 A | 10/1973 | Paul |
| 3,876,009 A | 4/1975 | Johnson, Jr. |
| 4,082,117 A * | 4/1978 | Peckham .................. 137/870 |
| 4,096,747 A | 6/1978 | Gilson |
| 4,286,667 A | 9/1981 | Westenhofer et al. |
| 4,573,361 A | 3/1986 | Kobold |
| 4,791,414 A | 12/1988 | Griess |
| 4,805,701 A | 2/1989 | Mountford |
| 5,056,712 A | 10/1991 | Enck |
| 5,085,076 A | 2/1992 | Engelmann |
| 5,139,044 A | 8/1992 | Otten et al. |
| 5,228,469 A | 7/1993 | Otten et al. |
| 5,236,002 A | 8/1993 | Martin et al. |
| 5,305,735 A | 4/1994 | Welden |

(Continued)

OTHER PUBLICATIONS

1993, Residential Domestic Shutoff Valve, Automatic.

(Continued)

*Primary Examiner*—Van T. Trieu
(74) *Attorney, Agent, or Firm*—Edward L. White

(57) ABSTRACT

A system for distinguishing between a fire sprinkler water flow and a domestic use water flow by supplying water to a dwelling through a multipurpose piping system to at least one domestic use and at least one fire sprinkler and providing a means for distinguishing between the fire sprinkler and domestic flow.

19 Claims, 17 Drawing Sheets

U.S. PATENT DOCUMENTS

| | | |
|---|---|---|
| 5,368,474 A | 11/1994 | Welden |
| 5,390,744 A | 2/1995 | McHugh |
| 5,396,745 A | 3/1995 | Klein |
| 5,419,203 A | 5/1995 | Carmichael |
| 5,483,838 A | 1/1996 | Holden |
| 5,503,735 A * | 4/1996 | Vinas et al. .................... 210/87 |
| 5,546,801 A | 8/1996 | Swinson et al. |
| 5,566,715 A * | 10/1996 | Griffin ................... 137/624.11 |
| 5,988,264 A | 11/1999 | Goldsmith |
| 6,113,642 A | 9/2000 | Petrofsky et al. |

OTHER PUBLICATIONS

1995, Potter Publication, VSR-F (Vane Type Waterflow Alarm Switch with Retard).

1995, Potter Marketing Brochures showing flow meters with alarm outputs.

1980, EnerCon, Tri-Water Systems, Engineering Instruction Manual 216-E-2.

1997, Series 007 Double Check Valve Assembly brochure.

\* cited by examiner

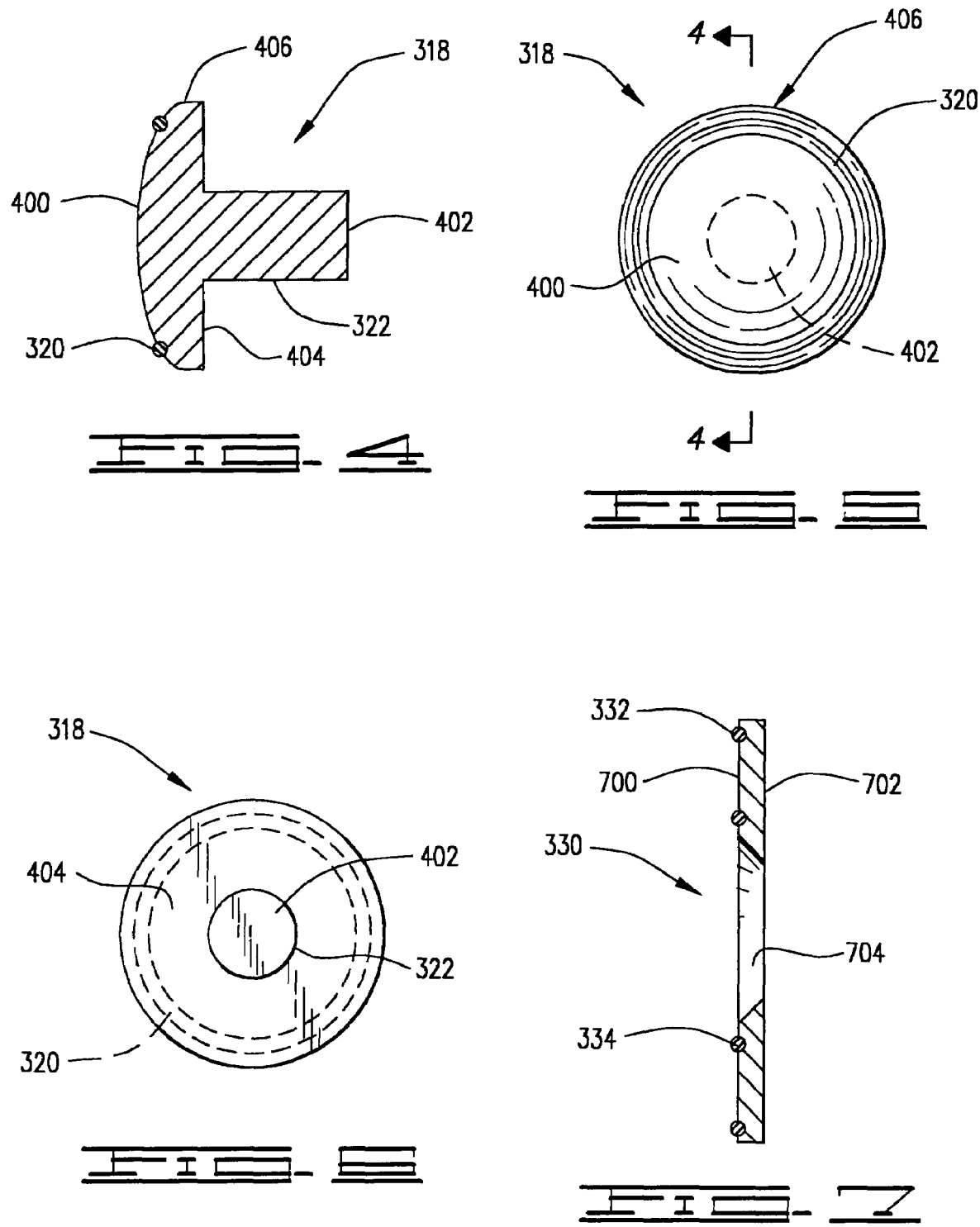

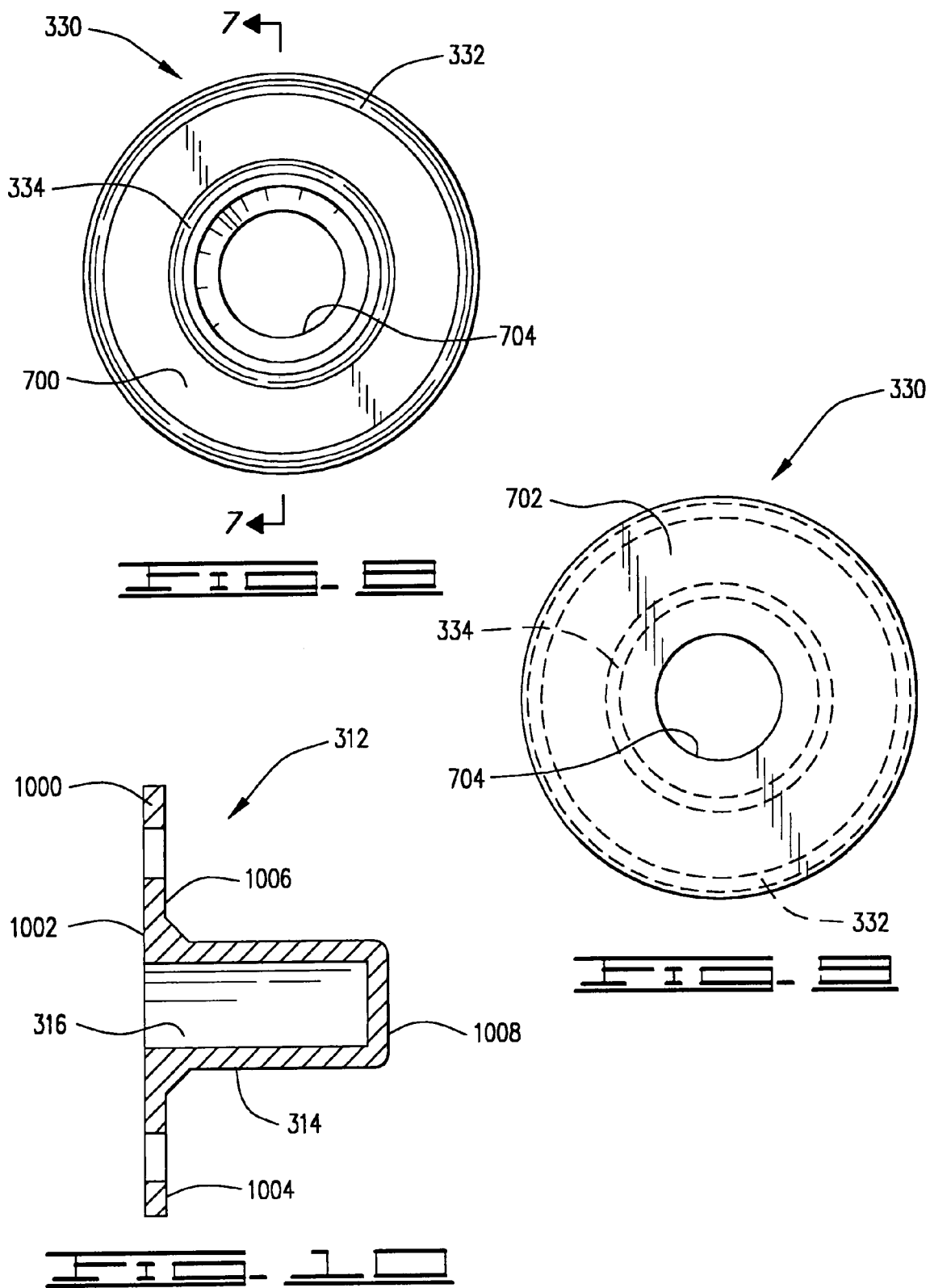

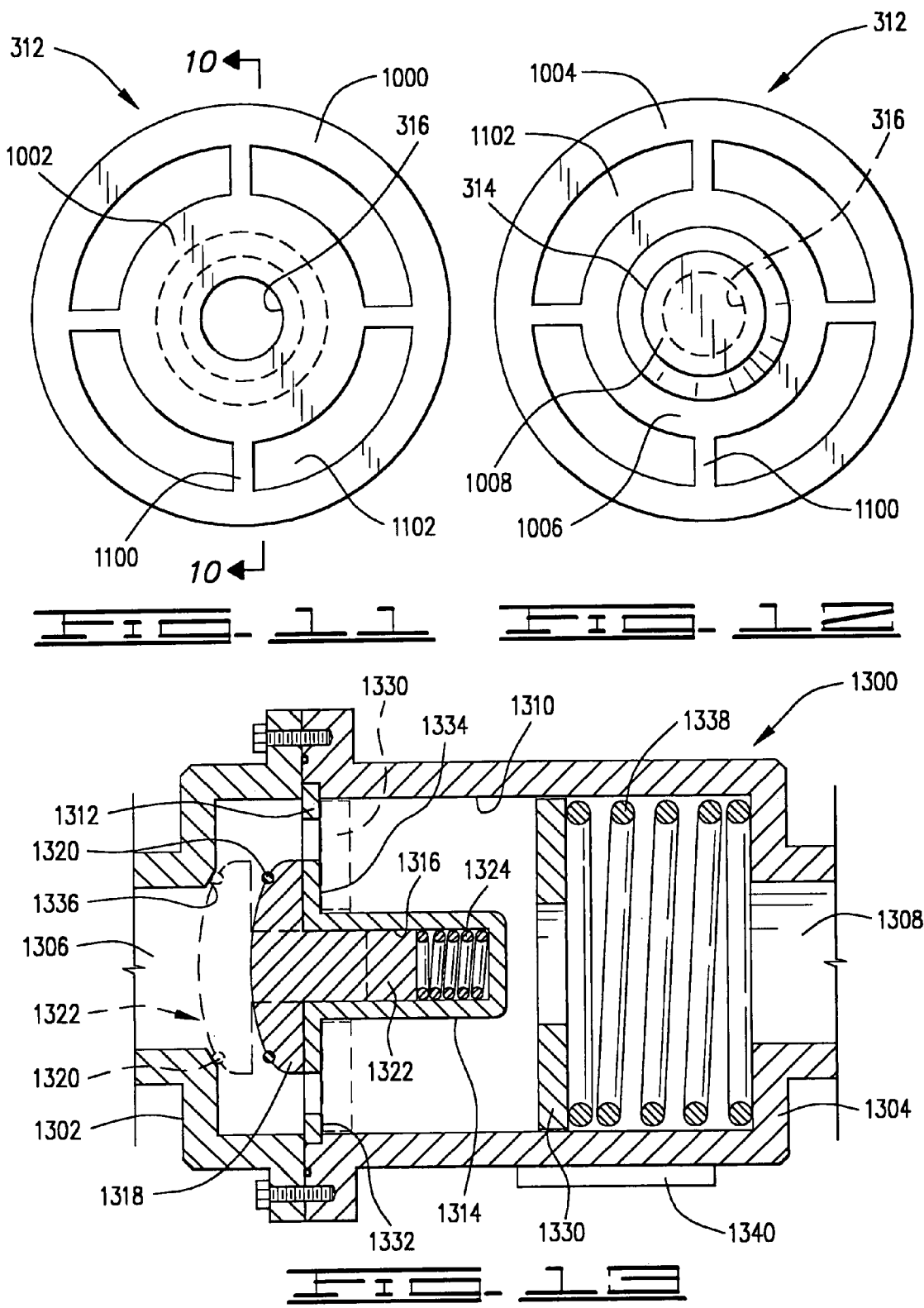

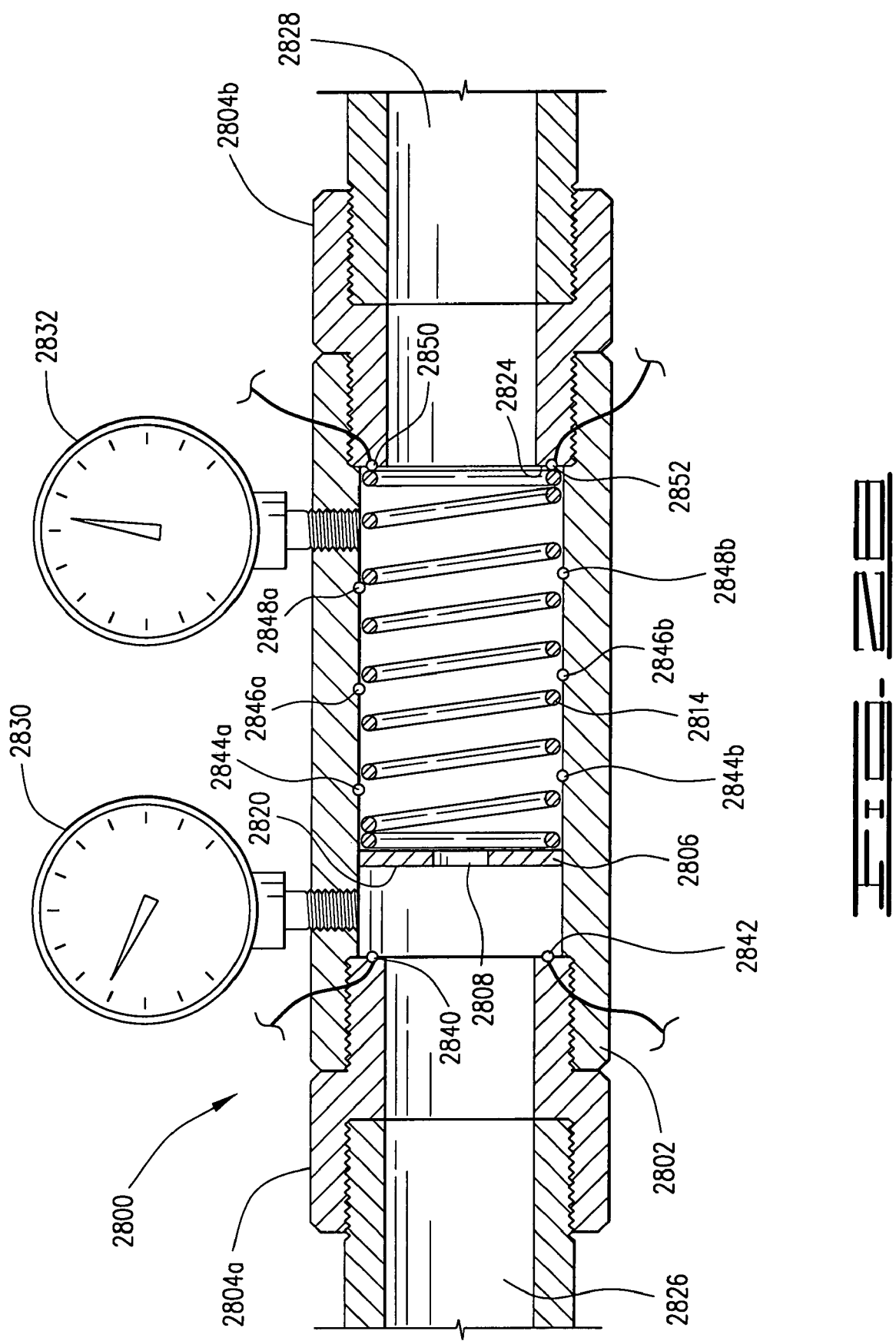

APPARATUS FOR FLOW DETECTION, MEASUREMENT AND CONTROL AND METHOD FOR USE OF SAME

CROSS REFERENCE TO RELATED APPLICATIONS

This application is a continuation of Ser. No. 11/174,242, filed on Jul. 1, 2005, which was a continuation-in-part of Ser. No. 10/880,123, filed on Jun. 30, 2004, now U.S. Pat. No. 7,221,281, which was a continuation-in-part of Ser. No. 10/118,207, filed on Apr. 9, 2002, now U.S. Pat. No. 6,914,531, which was a continuation-in-part of Ser. No. 9/993,537, filed on Nov. 6, 2001, now U.S. Pat. No. 6,741,179, which was a continuation-in-part of Ser. No. 09/567,510 filed on May 8, 2000, now U.S. Pat. No. 6,333,695, which application was a continuation-in-part of Ser. No. 09/483,999 filed Jan. 18, 2000, now U.S. Pat. No. 6,239,708, which was, in turn, a continuation-in-part of Ser. No. 09/098,976 filed Jun. 17, 1998, now U.S. Pat. No. 6,081,196 (hereinafter collectively referred to as the "Parent Applications").

BACKGROUND OF THE INVENTION

1. Field of the Invention

The invention relates to the fields of flow detection, measurement and control. The invention also relates to fire suppression systems, and, in particular, to multi-purpose piping systems for fire protection in structures and flow elements related thereto.

2. Description of the Prior Art

Practically any system where fluid flows in a conduit can use flow measurement devices. There are any many different kinds of flow measurement devices as there are systems where fluids flow in a conduit (such as a typical round pipe). For example, it is well known that there is a pressure drop across an orifice plate, and that this pressure drop can be used to determine the fluid flow through the pipe. The pressure drop is proportional to the velocity of the fluid in the pipe. As another example, a positive displacement device may be placed in a conduit, which directly measures the volume of fluid flowing therethrough. From the known volume measured by the positive displacement device, the velocity of the fluid in the pipe can be determined. Each type of flow measurement device has its strengths and weaknesses, and may be applicable to one system, while not being suitable for another.

Check valves (single and double acting) are also widely used in systems where fluids flow in conduits. The purpose of a check valve is to allow flow in one desired direction, but prevent flow in the opposite undesired direction. Existing check valves often use a moving seat, which is forced open by fluid flowing in the desired direction, but which moving seat is sealingly forced against an annular shoulder, preventing flow in the undesired, opposite direction.

It is well known to use electronic sensor means to transmit a signal generated by a flow measurement device to a read out or alarm means. The electronic output may be generated in response to a pressure transducer or the like. There are a myriad of ways to generate an electronic signal proportional to flow of a fluid in a conduit. As with our orifice plate noted above, the differential pressure is proportional to the flow in the conduit. Therefore, a differential pressure transducer exposed to the up stream and down stream fluids would produce an output electrical signal proportional to the flow of fluid through the conduit. In one type of paddle flow switch, the volume between the paddles is known, and a signal is generated indicating the number of revolutions per unit time of the paddle, thus allowing calculation of the flow velocity. Vane-type paddle flow switches are typically used in the fire protection industry, but vane-type paddle flow switches are generally not capable of measuring flow with any degree of accuracy.

Gems® Sensors markets several types of flow switches in their catalogues, which switches use Reed switch technology to measure flow. These devices are equipped with a magnet which is displaced by liquid flow to actuate a hermetically-sealed Reed switch isolated within the unit body of the switch. A positive spring-return de-actuates the switch when flow decreases. The pressure drop is low since the flow sensing elements moves out of the flow path after switch actuation. With only one moving part—the shuttle, paddle, or piston—Gems Sensors' flow switches are alleged to be inherently reliable. There are no bellows, diaphragms, or mechanical linkages to wear or get out of adjustment. Gems Sensors' FS-200 incorporates a magnet-equipped shuttle, which is displaced by fluid flow, actuating the hermetically sealed Reed switch. Gems Sensors also provides options vane bypass, which can be opened to allow additional flow to pass through the sensor before the Reed switch is activated. This optional vane device is externally adjustable with a blade screwdriver, for simple adjustment of the amount of flow required to actuate the Reed switch. Gems Sensors' model FS-10798 incorporates a piston which provides an alternative flow path for fluid. In the main flow path, there is a vane which can be adjusted to vary the amount of fluid flow which is required to move the piston a sufficient distance to activate the magnetic switch. The piston is equipped, of course, with a magnet, which activates an external Reed switch when it is displaced sufficiently. Therefore, there is no flow through the alternative piston path until it is displaced sufficiently to allow fluid to flow through an outlet port in the cylinder wall in which the piston moves.

It is well known to provide a dual check back-flow preventor for use in various types of systems. For example, Watts Industries, Inc., provides a Series 007 Double Check Valve Assembly. The Watts device has two moving checks in series, which are displaced by flow in a desired direction, but which positively seat to prevent flow in the undesired direction. As the checks are displaced by flow in the proper direction, flow passes out around the periphery of the checks. The checks are contained within a cage assembly, which allows passage of fluid between the legs thereof.

It is well known to provide a bypass means for allowing fluid flow around a restriction, in certain circumstances. For example, as disclosed in the Parent Applications for use in a multi-purpose piping system, it may be desirable to divert flow around a water softener where the demand for water in the residence for fire protection is greater than is able to flow through the water softener. As another example, in a chemical process, chemicals may be passed through a reactor unit. However, should the reactor become plugged or otherwise unduly restrict the flow, it may be desirable to bypass the reactor so as to prevent damage to the reactor vessel and/or a process upset. In these circumstances, it is necessary to have a bypass means which can divert flow around the flow element causing the pressure drop.

In most fluid flow systems, each of the above noted flow elements (flow measurement, check valve, bypass means) is a separate fitting which must be placed in the fluid system. It is often desirable to combine as many of the above noted functions into one device engineered for a particular purpose. The benefits of a combination of multiple devices, for example the flow meter, check valve, and means for converting a fluid flow to an electronic out put signal, are: a reduced number of devices reduces complexity, cost, and difficulty of installation of a fluid flow system.

It is also well known to provide a means for enunciating an alarm when water flows through a fire protection system. Typical commercial fire protection systems do not have significant water flow therethrough unless a sprinkler head is activated by a fire. Thus, the typical commercial system need only to detect whether or not flow is present, and if so, an alarm must be enunciated. That is why vane-type paddle flow switches are generally acceptable for commercial fire protection systems.

In U.S. Pat. No. 6,081,196, issued Jun. 27, 2000, for Apparatus And Method For Multipurpose Residential Water Flow Fire Alarm, a method was disclosed which allows the same piping to be used for both domestic and fire protection needs. The method provided for a flow detection and measurement means which is capable of distinguishing typical domestic flow from fire protection flow caused by the operation of one or more sprinkler heads. The ability to distinguish domestic flows from fire protection was based on the different flow regimes between fire protection and domestic uses.

The National Fire Protection Association ("NFPA") has established standards for the design and operation of multipurpose residential fire sprinkler systems. The standard is known as NFPA 13D, 1999 Ed. It defines a multi-purpose piping system ("MPS") as "[a] piping system within dwellings and manufactured homes intended to serve both domestic and fire protection needs."

Typical commercial fire sprinkler systems utilize a water flow detector to provide an alarm means. When a flow of sufficient, minimal, volume is detected, typical commercial systems indicate an alarm condition. The only reason that water typically flows in commercial systems is activation of a sprinkler head. Therefore, in a typical commercial system an alarm means need only determine whether or not water is flowing. Paddle flow switches are commonly used to determine when flow occurs in commercial systems. These are typically vane-type paddle flow switches.

In an MPS water regularly flows through the common piping. Flows occur to supply domestic needs within the structure. Whenever a sink, shower or toilet valve open, water flows in the MPS. Therefore, the alarm system used on typical commercial applications will not work for the MPS because simply taking a shower might cause a typical commercial flow detector to alarm when used with the MPS.

In light of this problem, typical residential and commercial applications have two completely different piping systems: (1) a fire sprinkler piping system, and (2) a domestic piping system. This doubles the number of pipes/fittings and the amount of plumbing work which has to be performed in a typical residential application. The same set of piping could not previously be used for both systems because the flow alarm could send false signals when domestic water was turned on. Alternatively, a residential application could use a fire detection system (i.e., smoke detector system). However, a smoke detection system does not alarm when water flows. Therefore, with a smoke detection system and no flow alarm, the fire sprinklers could run for days, causing extensive water damage, while the home owner is away on vacation and no alarm would sound. Also, smoke detection systems can be expensive.

As noted above, U.S. Pat. No. 6,081,196, issued Jun. 27, 2000, to Young, disclosed an Apparatus And Method For Multipurpose Residential Water Flow Fire Alarm. The apparatus for use as a multi-purpose residential fire suppression water flow alarm system disclosed in that patent was comprised of a supply side for delivering water under pressure; a multi-purpose piping system having a system side with common piping for delivering water from the supply side to a fire suppression side with one or more sprinkler heads and a domestic side for one or more domestic uses; a detecting means for detecting fire protection flow and for distinguishing that flow from a maximum domestic flow, the detecting means being disposed between the supply side and the system side; a drain test connection; and an alarm means. The method of utilizing the apparatus described above was also disclosed. One of the dependent claims from the above-noted patent, claimed a detecting means comprised of an orifice plate through which water flows causing a differential pressure measured by a differential pressure switch so that the flow rate to the orifice plate is proportional to the differential pressure allowing a determination of flow rate based on the differential pressure measured.

The flow detection means could utilize any number of well known flow measurement technologies, such as U.S. Pat. No. 5,288,469 to Otten et al. The Otten device incorporates both an orifice plate and a cone-shaped plug around which the water flows. U.S. Pat. No. 5,419,203 to Carmichael discloses a device similar to the device disclosed by Otten. Otten utilizes the Hall effect to measure the displacement of a displacement piston having a magnet incorporated therein. Carmichael utilizes strain sensors to measure the strain caused by displacement of a cone-shaped plug biased by a spring member. As the flow increases, the cone-shaped plug displaces backwardly in reaction to the flow putting greater pressure on the spring and consequently, greater pressure on the pressure sensors incorporated in the device. The Otten and Carmichael devices have several common features, namely a chamber having an orifice plate and a plug-shaped device adapted to be deflected away from the orifice plate in proportion to the flow rate through the chamber. The flow measurement means must be simple in both operation and concept so that it will be inexpensive to build and can be easily programmed and calibrated in the field. The problem with Otten and Carmichael is that their devices allow flow therethrough the instant pressure is applied across the orifice plate. As disclosed, they are not capable of serving as a bypass means for allowing flow only when the differential pressure exceeds some preset level.

Critics of the MPS have also noted that it is common for residential systems to incorporate a water softener or similar devices (such as filters, chlorination systems, UV purifiers and the like). Water softeners and similar devices can create substantial drops in system pressure and flow such that the water supply flowing through a typical residential system may not be sufficient for fire protection needs. Therefore, there is a need for a bypass mechanism which will allow sufficient flow in fire protection situations to bypass the water softener to supply the fire protection needs.

Prior art systems also suffered from problems with freezing. Where lines were in locations that could reach temperatures below freezing, it was a common problem to face freezing in the pipes, which could crack sprinkler heads and/or piping systems. Prior art systems addressed this problem in a number of ways, including dry pipe systems, which do not have any water in the piping until fire is sensed, by placing pipes in locations where they were not exposed to cold temperatures (for example, by placing insulation wrap over piping systems in favor of heated spaced below) and the like.

The NFPA allowed the MPS because, in their estimation, the cost savings associated with single systems instead of duplicate systems, would cause the MPS to be installed in more homes, thus saving more lives. However, the NFPA provides no means for alarming upon a water flow condition in the MPS, which is a system where both domestic and fire protection systems use common piping.

There was previously no flow detection means for use with an MPS. As noted above, typical flow detection means alarm upon detection of a minimum flow. Therefore, given the common piping system in an MPS, typical domestic uses could cause the prior art flow detection means to send an alarm signal to the alarm means. NFPA provided for installation of a non-water-flow-based smoke detection and alarm system for use with the MPS. These non-water-flow-based smoke detection and alarm systems are expensive, and they are not capable of detecting flow through one or more fire protection sprinklers. The inability of a smoke detection system to detect and enunciate a water flow alarm could result in extensive water damage to the property.

A cousin to the multi-purpose system for use generally in commercial applications was the "Tri-Water Systems™" that were sold by American Air Filter starting in the early 1980's. The Tri-Water System allowed for cost savings, but there was one serious flaw; namely, there was no way to provide a water alarm for the sprinkler system. Thus, the Tri-Water System was a failure. The documentation provided by American Air Filter for the Tri-Water System alleged that:

> The purpose of the flow switch is to trigger an alarm when the sprinkler is activated. the flow switch manufacturers provide detailed instructions for trimming the paddles and adjusting switch spring tension. If paddles are not trimmed for actual flow conditions, nuisance alarms will be sounded; unnecessarily evacuating the building and "rolling" the fire department.

Instructions provided by American Air Filter for the Tri-Water System at page 9. This statement was untrue. Manufacturers of paddle switches specifically provide that they cannot be trimmed, and must be used as they are provided by the factory. Therefore, this oversight, namely the failure to provide a flow switch, meant that very few Tri-Water Systems were installed, and the concept fell from favor. A Tri-Water System is shown in FIG. 24, with improvements incorporated pursuant to the present invention. As with the old Tri-Water System, using the present invention, the same piping to be used for heating and cooling water as well as for feeding fire protection sprinklers.

3. Parent Applications

The Parent Applications (U.S. Pat. No. 6,081,196 issued Jun. 27, 2000, U.S. Pat. No. 6,239,708 issued May 29, 2001, and U.S. Pat. No. 6,333,695 issues Dec. 25, 2001) disclosed the MPS with a water flow alarm. Since they envisioned the MPS, common piping carried water throughout the system. After passing through the main control valve, water passed by a pressure gauge, then through a flow detection means. In combination the flow detection means and the pressure gauge allowed for determination of whether the water supply is sufficient for fire protection needs. The flow detection means was connected to an alarm means which activated upon the detection of a flow rate greater than maximum domestic flow. Methods of detecting and measuring flow and alarming upon excessive flow are illustrated, for example, in Otten, et al., U.S. Pat. No. 5,228,469. Disposed after the detection means was a drain test connection. This drain test connection served the same purpose as it did in the prior art. The drain test connection also preferably included an orifice plate with interchangeable orifice plates for simulating different flow regimes. For example, one orifice plate could simulate the operation of a single fire sprinkler while another orifice plate simulated the domestic usage. These interchangeable orifice plates could then be used to calibrate the operation of the alarm means. Common piping carried water throughout the system to both domestic and fire protection uses. Rather than having distinct fire sides and domestic sides, the Parent Applications disclosed short sections of pipe split off from the common piping which were designated as either fire side or domestic side.

The Parent Applications also disclosed a flow sensor incorporating a combination orifice flow meter/displacement magnetic flow sensor in an annular housing. The annular housing was preferably be composed of a non-magnetic, metallic material, such as aluminum. Alternatively, the annular housing could be comprised of a polymer such as CPVC or similar materials. The material of construction was not critical so long as it did not interfere with the magnetic activation of the Reed switch. The annular housing had two ends, and at each end a bushing or reducer adapted to be threadedly (or by a socket) attached thereto to allow connection of an inlet pipe at an inlet end of the annular housing and an outlet pipe at an outlet end of the annular housing. A moving orifice plate, having a front face and a back face, was adapted to be received within the annular housing. The annular housing had at least one section with a continuous diameter defined therein for receiving the moving orifice plate. The moving orifice plate had a diameter which was slightly smaller than that of the continuous diameter section of the annular housing, allowing a sliding motion therein, but preventing excess fluid to flow around a periphery of the moving orifice plate. A moving plate opening was defined at or near the center of the moving orifice plate. An orifice plate magnet flange having a diameter larger than that of the moving plate opening was disposed on a back face. Disposed substantially around and outside the flange was a circular orifice plate magnet. The moving orifice plate was biased away from the outlet end by a orifice plate spring. The orifice plate spring was contained between an interior flange shoulder near the outlet end, and the orifice plate magnet. Mounted on an exterior portion of the annular housing was a Reed switch. The Reed switch was attached to the annular housing by an adjustable attachment means. Adjustment screws held the adjustable attachment means in place and allowed it to be loosened for movement of the Reed switch for calibration of the device.

The Parent Applications also disclosed another related embodiment of the combination orifice flow meter/displacement magnetic flow sensor. This embodiment was adapted to be used in systems where a water softener or similar pressure drop causing device is present. The outlet to the water softener was on the supply side of the sensor, and the inlet from the water softener was on the system side of the sensor. A "bullet rod" was held in place by a bullet port within the annular housing. The bullet port was comprised of an outer annular ring held in place between an annular shoulder and a bushing, support legs projecting inwardly from the annular ring, and an inner support ring. An open port area was defined between each of the support legs. Preferably, the sum of the open port areas was at least as large as the cross sectional area of the inlet pipe connected to the sensor, thus, the pressure drop through the device was minimized. A bullet rod having a head portion with a leading end and a threaded male end adapted to be received through the inner support ring was provided. A tail portion had a threaded female end adapted to threadedly engage the male end, so that the tail portion is held in place against the inner support ring. The tail portion also had a tapered end. The tapered end faced the outlet end of the sensor. The moving orifice plate opening was sized to receive the tail portion so as to allow sliding motion of the moving orifice plate and also to minimize flow between the tail and the orifice plate. Thus, as the moving orifice plate was displaced toward the outlet end by pressure drop, substantially all of the flow was diverted through the water softener until the pressure drop created by fire flow displaced the orifice plate past the tapered end, at which point water flowed through the orifice in the orifice plate. As discussed below, preferably two Reed switches were provided, the first for a trouble alarm, and the second for enunciating the alarm means.

Another embodiment of a fire protection system incorporating the apparatus is discussed below. The water from the water supply first flows through a flow sensor passing through an inlet softener line to a water softener or similar water treatment or processing device and thence through the outlet softener line back through the flow sensor. The operation of the flow sensor will be more fully described hereinafter, but for the present time it is sufficient to say that the flow sensor typically directs water through the inlet softener line through the water softener and then back through the sensor to a first pipe section. However, whether there is an excessive water demand in the system, for example such as one caused by the operation of a fire protection sprinkler, there is a mechanism incorporated in the flow sensor which allows water to bypass the water softener increasing the flow rate through the system. The water, which is passed through the water softener, is next split, some of it passing into the cold water piping, and the rest of it passing into a second pipe section.

The water from the second pipe section next passes through a second flow sensor. A check valve may also be incorporated in the second pipe section. The check valve prevents back flow of water, which potentially could be stagnate from the fire protection system, to the cold water piping and/or the water softener. The second flow sensor passes water down through a water heater via an inlet heater line, and back to the sensor via an outlet heater line. Again, the second flow sensor incorporates a bypass means which allows water to bypass the water heater where there is an excessive demand. After being heated, the water passes into a multi-purpose pipe section. Attached to the multi-purpose pipe section are typical domestic uses such as a shower head and a faucet. Other uses, such as toilets, dishwashers, washing machines, and the like may also be attached to the multi-purpose pipe section. Also in communication with the multi-purpose pipe section are one or more sprinkler heads. The sprinkler heads are in communication via a passive pump and a head fitting with a multi-purpose pipe section. The operation of the passive pump in cooperation with the head fitting and the sprinkler heads will be more fully described hereinafter. However, the purpose of the passive pump is to utilize the velocity head of water flowing through the multi-purpose pipe section to circulate water to and around the sprinkler heads to minimize stagnation thereat.

Two flow sensors may be incorporated into the multi-purpose piping system. If there is no water softener, there will not be a need for one of the flow sensors. The only flow sensor will be on the hot water heater. Alternatively, it may be desirable to have only one flow sensor present at the water softener. In such a case, the flow sensor at the water softener will also measure the cold water flow, potentially contributing to more false alarms in the multi-purpose alarm system. However, this may be desirable where the risk of false alarms is not substantial, and the cost savings is sufficient enough to justify a single sensor at the water softener only. It is not believed that the hot water heater will cause a significant pressure drop in the flow therethrough. Therefore, the bypass means at the hot water heater is not believed to be necessary to ensure that adequate flow is available for fire protection needs. Rather, as shown, the advantages that the flow sensor placed on the hot water heater only measures the flow through the hot water domestic uses, as well as the flow to the fire protection sprinklers. Thus, the chance of a false alarm is minimized.

From the passive pump, water is passed to a head fitting. The water passes to the head fitting from the multi-purpose pipe section via the head supply line. It is returned to the multi-purpose pipe section via the head return line. A reverse-j fitting supplies water from the head fitting to the sprinkler head. The purpose of the reverse-j fitting is to cool the water supplied to the sprinkler head to insure that the sprinkler head is not activated by the temperature of the water supplied thereto. Most sprinkler heads are set to activate at a temperature of 155° Fahrenheit. While it is not anticipated that hot water flowing through the multi-purpose piping system will exceed that temperature (most hot water heaters have a 140° Fahrenheit maximum temperature), the reverse-j fitting helps to insure that just in case the water does exceed that temperature, the fire sprinkler is not inadvertently activated by water passing thereto.

As shown, a thermocouple in communication with the pump controller and control wiring operates to ensure that a minimum desired temperature is maintained in the common piping. The thermocouple measures the temperature of water in the common piping. If the measured temperature drops below a preselected level (preferably at least 40° Fahrenheit), the pump controller initiates the action of a pump. The measured temperature may be a water temperature in the system preferably remote from the utility room where the heater is located. Alternatively, the temperature may be an air temperature or a combination of air and water temperature measurements. The pump draws water from the common piping via a pump inlet pipe. A pump outlet pipe directs water through a check valve and a return pipe so that it is recycled through the water heater. The return pipe connects to the inlet heater line to complete the circuit. Thus, water moved by the pump through the water heater is reheated to maintain a minimum temperature in the multi-purpose pipe section.

An alternative embodiment includes a return leg supply pipe and a return leg flow sensor. The return leg supply pipe may be in communication with the first pipe section. The return leg flow sensor normally prevents any water from flowing directly from the first pipe section through the return leg supply pipe into the multi-purpose pipe section. However, when an excessive water demand is made on the multi-purpose pipe section, the pressure may drop low enough so that the return leg flow sensor (without an alarm means) allows water to pass therethrough directly from the first pipe section, bypassing the flow sensor and the other elements of the water heater system. Alternatively, the return leg flow sensor may draw water from the multi-purpose pipe section at a point adjacent to the outlet from the flow sensor. This creates an alternative flow path for hydraulic advantage in the design of the system.

To reiterate, one of the problems to be solved by the Parent Applications was provision of a water-flow-based means of alarming the MPS. In the past, such systems had to utilize two completely different piping systems: one for domestic uses and one for fire sprinkler system uses. Previous alarms used in these systems were designed to create an alarm condition upon the detection of a flow (commonly 8-10 gpm). As noted previously, vane-type switches are very inaccurate in determining flow rate. Typical domestic flows could have caused an alarm in a prior art system. Alternatively, prior art systems used a smoke detection and alarm system which did not have a flow detector. These systems without a flow detector risked substantial water damage to the structure if a sprinkler head activated while no one was in the home.

The Parent Applications used the principle that domestic flow rates are much lower than flow rates needed for fire protection. Using a flow detection means, it was possible to create an alarm condition only upon detection of flows which are such as created by fire protection needs. Thus, an alarm condition was not created when typical domestic uses only were detected.

Preferably, the Parent Applications also incorporated a tamper detection means on the main control valve. The tamper protection means determined whether the main control valve was closed, and if so, enunciating a trouble alarm. A pressure gauge was also preferably provided in the system.

The combination orifice flow meter/displacement magnetic flow sensor disclosed in the Parent Applications preferably had two normally open Reed switches disposed thereon for detecting flow as indicating by displacement of the moving orifice plate. The first Reed switch was the same as previously disclosed, and enunciates a fire alarm via the fire alarm means. Preferably, the first Reed switch also activated a system which contacts emergency response personnel, such as fire departments. In addition to the fire alarm Reed switch, a second Reed switch may be provided. The second Reed switch enunciated a first stage "trouble alarm". Preferably, the first stage trouble alarm only enunciated within the structure (i.e., emergency response personnel were not contacted). The trouble alarm was created if the domestic usage was excessive. Where the system was used with the MPS, the first stage alarm would naturally cause anyone in the residence to instinctively shut off water, for example a shower they may be taking. As another example, if a resident heard a first stage alarm, and they were washing dishes, they would most likely shut off the sink faucet. This natural reaction to the first stage alarm may reduce the water flow demand below the level where the first stage alarm enunciates, eliminating the alarm condition. The first stage Reed switch is displaced a slight distance toward the inlet of the flow sensor relative to the fire alarm Reed switch. Thus, as the moving orifice plate is displaced towards the outlet end of the flow sensor, it will first activate the first stage Reed switch, enunciating the internal first stage trouble alarm. As the orifice plate continues to be displaced towards the outlet end, it will next activate the fire alarm Reed switch, which enunciates the alarm means, preferably notifying emergency response personnel. The relative linear displacement of the fire alarm Reed switch and the trouble Reed switch was to be set in the field so that there was sufficient differential in the flow which activates the first stage alarm and the fire alarm to give residents or occupants of the structures sufficient time to shut off domestic demands before a fire alarm is created. This two-stage system also serve as a safety back up, because if one of the alarm stages fail, the other still alerted residents to the potential alarm condition.

Tamper detection means on the main control valve preferably incorporated Reed switches as well. As the handle was turned, a magnet on the handle activated a normally open Reed switch, causing it to close, enunciating an alarm notifying the occupants of the structure that the main control valve had been closed, and the fire protection system was not being supplied with water. Again, this is an important safety consideration in residential systems where small children, unknowing homeowners, and the like can easily turn off the system without realizing they are shutting off their fire protection system as well. However, the tamper means is more critical in commercial stand-alone systems. Otherwise, no one might notice the valve was closed until the sprinkler system failed to operate when needed. In an MPS, the residents of the structure would quickly realize the valve was off because they would not have any water for domestic uses.

Though the Parent Applications described the inventions therein with reference to a multi-purpose piping system, it should be understood that the system could be used with any flow-based system. Further, the flow detection means disclosed herein could be used with any flow system, not just fire protection systems. That is, the flow detection means are capable of detecting the flow of any fluid through a piping system. The piping system could carry hydrocarbons, solvents, or any other liquid or potentially gaseous materials for that matter.

In operation the apparatus disclosed in the Parent Applications functioned as both a domestic water supply system and a smoke detection and alarm system. Under normal conditions, the water flow rate through the flow detection means did not reach the fire suppression flow rates. When one or more sprinkler heads activated, the flow detection means detected the increased flow and sent an alarm to the alarm means. The alarm means enunciated a visible and/or audible alarm indicating the alarm condition. It is well known in the prior art to activate a telephone modem-based system for calling, for example, the fire department, upon detection of an alarm condition. See, e.g., Otten, U.S. Pat. No. 5,139,044. It was preferable to incorporate such a modem-based component in the present invention to notify the fire department and other emergency contacts should a fire alarm condition be detected. If one or more domestic cutoff valves were included in the apparatus, the flow detection means also sent a signal to activate the domestic cutoff valves, shutting off water to one or more domestic uses and providing more water for the fire sprinklers.

When the two-stage alarm system was provided, it was necessary to calibrate both the first stage trouble alarm Reed Switch and the second stage fire alarm Reed switch. The preferred method was to first calibrate the fire alarm Reed switch. The calibration was very simple. First, the drain test connection is opened to simulate fire protection needs, the connection means for the Reed switch were loosened, and it was moved towards the inlet end of the sensor until an alarm condition was created. The first stage Reed switch was then moved a slight distance further towards the inlet end. A typical domestic demand was then created by using the drain test connection or flowing water from some number of plumbing fixtures. As the flow through the drain test connection exceeds the high end of the expected domestic demand, the first stage Reed switch should be activated, activating a first stage trouble alarm. If the alarm is not activated, the first stage Reed switch is moved further towards the inlet end of the sensor.

4. Shortcomings of the Prior Art

In prior systems it was often necessary to provide both a double check valve element and a flow detection/measurement/control sensor. Both of the elements increased the cost of this system and increased the pressure drop through the system. There was a need for a flow sensor that could both serve as a double check and as a flow detection or measurement means.

In multi-purpose piping systems, as well as stand-alone fire protection systems, there was the problem of stagnation (where water was to be used for human consumption) of water in the piping as well as the problem of freezing, where piping was exposed to temperatures lower than 32° Fahrenheit. Freezing presented itself as a problem where piping was installed, for example, in an attic of a residence. There was therefor a need for a system which provides for the warming of pipes to prevent freezing, as well as circulation through the pipes to prevent stagnation.

Another problem that plagued prior art systems was the issue of retrofitting existing structures for fire protection systems. Retrofitting for a fire protection system in a typical structure would be very expensive because, where the freezing issue is a problem, piping would have to be installed in conduits below the ceiling of the structure (or at least under insulation) to prevent the danger of freezing.

In commercial systems, fire protection sprinklers have been standard equipment for years. In addition, these buildings have also been provided with piping to circulate heated/cooled water for temperature control purposes. It would be advantageous if the fire protection piping could be combined with the piping to distribute heated/cooled water. However, the greater demands of flow required for fire protection purposes had previously prevented this dual use of the piping. The "tri-water system" which proposed to use the same piping for both purposes provided for a water flow alarm, which made the system undesirable, and eventually resulted in its abandonment.

SUMMARY OF THE INVENTION

It is therefore an object of the invention to provide an apparatus for flow detection and measurement. It is also an object to provide a method for using the disclosed apparatus in fire protection systems. The apparatus and method overcome one or more of the disadvantages of the prior apparatus and systems.

It is an object of the present invention to provide an apparatus for flow detection, and measurement. The apparatus includes a moving plate means, a sensor means, and a biasing means. It may also include a sealing means for preventing flow through the sensor until a specified differential pressure is reached. The apparatus for flow detection and measurement can incorporate a bypass means for allowing additional flow to pass through the flow measurement device as needed. When water is allowed to flow through the bypass means, an alarm may be enunciated should the flow reach a specified level. More particularly, the objects of the apparatus may be accomplished by providing a moving orifice plate with a magnet moving in cooperation therewith. The magnet activates a Reed switch on an external surface of the flow sensor when the moving orifice plate is displaced a sufficient distance by the flow passing through the sensor. When the water demand exceeds that which can flow through the primary path, the moving orifice plate is displaced beyond bullet rod allowing flow through the orifice.

It is a further object of the invention to provide a flow sensor which can serve as a single or double check valve. This object of the invention is achieved by providing a moving seat, in cooperation with the moving plate, for providing two back flow prevention means. When water moves through the flow sensor in the desired direction, the moving seat allows water to pass thereby, and when sufficient water flows through the sensor, the moving orifice plate is displaced so that water can pass through the orifice therein or around the periphery of the plate. When water flows in the undesired direction, the moving seat is biased to cause a sealing action of a check o-ring against a check shoulder seat. Similarly, the moving orifice plate is biased so as to create a seal between an outer seat and an outer orifice o-ring, as well as between an inner seat and an inner orifice o-ring. Thus, in combination, the moving seat and the orifice plate provide a double check. Incorporating the double check technology, a single flow sensor can serve as a flow measurement device, a double check valve, a bypass means, a flow and pressure gauge or ports, as well as creating an electronic output signal for enunciating an alarm or the like.

It is an object of the present invention to provide a fire protection piping system having a water supply, a means for heating water, at least one fire protection sprinkler, a common piping means for receiving water from the supply, passing it through the heating means and delivering it to at least one fire protection sprinkler, and circulating means for circulating water through the common piping back to the heating means to maintain a specified minimum temperature in the common piping. By providing these elements, the danger of water freezing in the common piping is eliminated. In one embodiment, the circulation means comprises a pump controlled by a temperature measurement means for determining when the temperature of water in the piping drops below the minimum temperature specified. The controller engaging the pump which re-circulates the water in the piping through the heating means once the temperature drops below the desired level. At the same time, the recirculating of hot water through the system also eliminates the problem of stagnation.

It is also an object of the present invention to provide the foregoing advantages in a system where at least one domestic uses is also supplied with hot water by the common piping. When the present system is used in a multi-purpose piping system, homeowners have the added benefit of instant hot water from a faucet or the like.

It is an object of the present invention as well to provide a flow sensor which incorporates at least a single stage means for enunciating an alarm. The flow sensor may incorporate as many as three or more levels of alarm for the taking of various actions by the system upon the detection of the specified level of flow required to enunciate the alarm.

It is also an object of the present invention to provide a means to compensate for pressure drops in a typical MPS. More particularly, typical pressure drops include, but are not limited to, a water softener which may be placed in line in the system. Water softeners are typically used in multi-purpose systems to improve the quality of water for domestic use in the residence. In addition to water softeners, pressure drops may include filters, UV treatment of water, and the like. There are many reasons why people want to treat water coming into their homes for domestic purposes. Many of these treatment means will reduce the pressure of the water through the MPS system. Thus, there may be a need for fire protection flows to bypass these pressure drops in the system, or to at least compensate for them. The present invention takes these types of pressure drops into account by providing a bypass means. In typical domestic flow situations, the entire flow of the water supply goes through the treatment method in question, such as a water softener. However, when the system side pressure drops below a set level, a relief allows additional flows through a lower pressure drop path.

By the same token, devices previously available for the measurement of flow caused another pressure drop. As noted above, pressure drops in the MPS can prevent sufficient flow from being available to satisfy fire protection needs. Therefore, it is also an object of the present invention to provide a volume flow detection and measurement means for use in the MPS which have minimal pressure drops. The flow detection means discussed are very simple in operation and easy to calibrate in the field. They may be used to provide a read out of the flow, or may simply provide an alarm when fire protection flows are detected.

It is also an object of the present invention to provide a flow measurement device with a higher capacity still for use in standard wet pipe systems. Under some circumstances, it may be desirable to use an expanded chamber system along with the orifice plate. In these devices, as the orifice plate is deflected backwardly by the water pressure and flow, it moves into an area of expanded cross-section where the water can flow not only through the center of the orifice plate, but around the edges thereof. This expanded area minimizes the pressure drop through the flow sensor at high demands, such as is the case where multiple sprinkler heads may have activated.

It is an object of the invention to provide a system which can incorporate both a water softener and use of heated water from the hot water heater in the structure. As noted above, the bypass means may be the flow sensor as described herein. Alternatively, the bypass means may comprise a flow sensor for measuring fluid flowing through the common piping, a normally closed valve, and a controller in communication with the flow sensor and in a controlling position of the valve for opening the valve when demand for water exceeds the capacity of flow through either the heating means and/or the water softener. This valve-based bypass system requires mechanical intervention, so it is not as simple as the system incorporating the valve and the flow sensor with integral bypass means. However, it may be desirable in some applications.

A system for providing circulation of water around fire protection sprinklers, the system comprising, common piping carrying water, which water is caused to flow at periodic intervals; a head fitting receiving a fire protection sprinkler therein and further defining a chamber therein in communication with the sprinkler; supply and return lines for supplying water to and returning water from the head fitting; and a pump means for using the velocity head created by water flowing through the common piping to pump water to the head fitting causing circulation there through as a result of and in cooperation with flow through the common piping, is disclosed. As disclosed, the circulation systems does not require any mechanical input. That is, no pumps or motors are required for the pumping system. However, it is anticipated that in some cases it may be desirable to use a mechanical pump based on either electrical, air, or similar power means. In those cases, the pump will not rely on the velocity head of water flowing through the common piping.

It is also an object of the invention to provide a integrated system incorporating the above-noted elements of the invention and having a two-stage alarm for enunciating a pre-alarm, as well as a full-blown fire alarm. The integrated system has two sensors on the flow detection device, the first sensor enunciating a trouble alarm when a specified flow is created, and if the flow further increases, a second sensor enunciating a fire alarm, which also preferably calls emergency response personnel. The first trouble alarm is audible only in the residence or structure where the system is deployed. Preferably, as noted, the second fire alarm will contact emergency personnel, possibly via a telephone modem-type connection. The integrated system also preferably incorporates a tamper switch on a valve incorporated in the system to shut off the flow thereto. The tamper switch will enunciate if water flow to the fire protection system is shut off.

It is a further object of the invention to provide a system for use in a commercial application which meets the heating/cooling needs of the structure, as well as the needs for fire protection. The integrated system uses one set of piping to provide re-circulated water for heating/cooling, as well as to provide water for fire protection purposes. A water flow alarm is provided in the system using one of several means to determine whether a fire sprinkler has been activated.

Another object of the invention is to provide a system which can be used as a water flow monitor when a structure is unoccupied. That is, using the flow sensor apparatus in cooperation with a standard structural alarm system, it is possible to create a water flow alarm which will indicate when there is a probable leak in a structure. The structure alarms in question typically have three modes of operation: a first mode where the structure is occupied, and the alarm is not armed; a second mode where the structure is occupied, but the alarm is activated; and a third mode where the structure is unoccupied. The water monitor alarm only operates when the alarm system is in the third mode, indicating that there should be little or no water usage within the structure.

Finally, it is an object of the present invention to provide a shut off valve to automatically prevent water from flowing to a lawn sprinkler should a trouble or fire alarm be enunciated. The shut off valve would be activated by a controller or directly by the signal sent from the flow sensor, indicating that there was either a trouble alarm or a fire alarm condition. Where this shut off valve is incorporated into the present system, it may be preferable to have a normally closed Reed switch along with the other Reed switches, to close the normally closed shut off valve when a magnet is displaces sufficiently far to activate either the trouble alarm or the fire alarm.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

BRIEF DESCRIPTION OF THE DRAWINGS

In the drawings:

FIG. 4 is a detailed cross-sectional view of the moving check used in the double check apparatus of FIG. 3.

FIG. 5 is a detailed front view of the moving check.

FIG. 6 is a detailed back view of the moving check.

FIG. 7 is a detailed cross-sectional view of the moving orifice plate used in the double check apparatus of FIG. 3.

FIG. 8 is a detailed front view of the moving orifice plate.

FIG. 9 is a detailed back view of the moving orifice plate.

FIG. 10 is a detailed cross-sectional view of the bullet port used in the double check apparatus of FIG. 3.

FIG. 11 is a detailed front view of the bullet port.

FIG. 12 is a detailed back view of the bullet port.

FIG. 13 is a cross-sectional view of another embodiment of a double check valve where the magnet is plastic coated and forms the moving orifice plate.

FIG. 28 is a cross-sectional view of an embodiment of a flow sensor similar to FIG. 1, but incorporating different sensor technology.

DESCRIPTION OF THE PREFERRED EMBODIMENTS

A flow sensor, from which the flow sensor disclosed herein was described in U.S. patent application Ser. No. 09/483,999, filed Jan. 18, 2000. That application disclosed a flow sensor, which could be used with a multi-purpose piping system for a fire suppression system/domestic water supply system in a structure. The device was disclosed as being used in a fire protection system, but it was noted that the sensor could be used in any flow measurement situation as well as in situations where a bypass means was desirable. The device disclosed more fully hereinafter, is intended to, and certainly can, be used in any appropriate flow measurement situation. For example, in a petrochemical facility, materials may be passed through a reactor unit to cause a change in their chemical structure. However, should the reactor become plugged, it may become desirable to have a bypass mechanism which allows the petrochemical to be vented to an emergency flare system, rather than causing a rupture or other failure of the reactor vessel. Such an application would be an appropriate use for the present flow sensor.

Sensors designed according to the present invention generally have a moving plate means, a sensor means, and a biasing means. In addition to the above-noted elements, the sensors may have a sealing means for preventing flow through the sensor until a specified differential pressure is reached. The sealing means may generally be a bullet rod received within an orifice defined in a moving plate, or it may be a cylinder which slidingly and sealingly receives the moving plate means, which cylinder is closed for a portion of its length, and open for another portion of its length to allow flow therethrough.

The sensor means will be more fully described hereinafter. However, in a preferred embodiment, the sensor means is a magnet in cooperation with a Reed switch. The sensor means may also be electrical contacts, as illustrated in FIG. 28, a pressure transducer engaged with the biasing means for measuring the pressure caused by the displacement of the moving plate, or use of the spring itself as a resistance coil, which coil has resistance that changes in proportion to its compression. The scope of the invention is intended to incorporate well-known technology for measuring the displacement of the moving plate. Such technologies include, but are not limited to those noted above.

Figure 1:
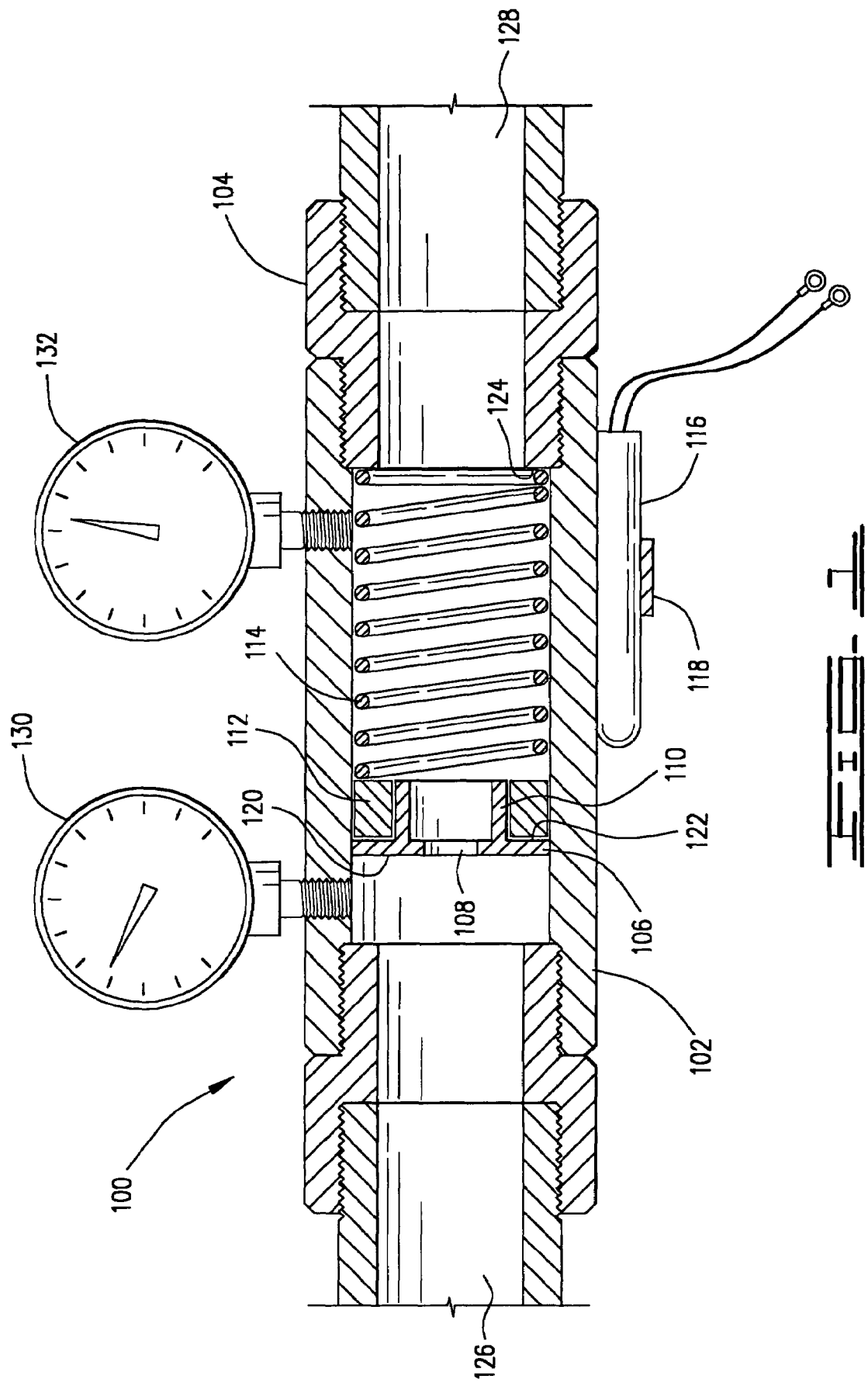
FIG. 1 is a cross-sectional view of one embodiment of the flow apparatus/sensor.
Figure 2:
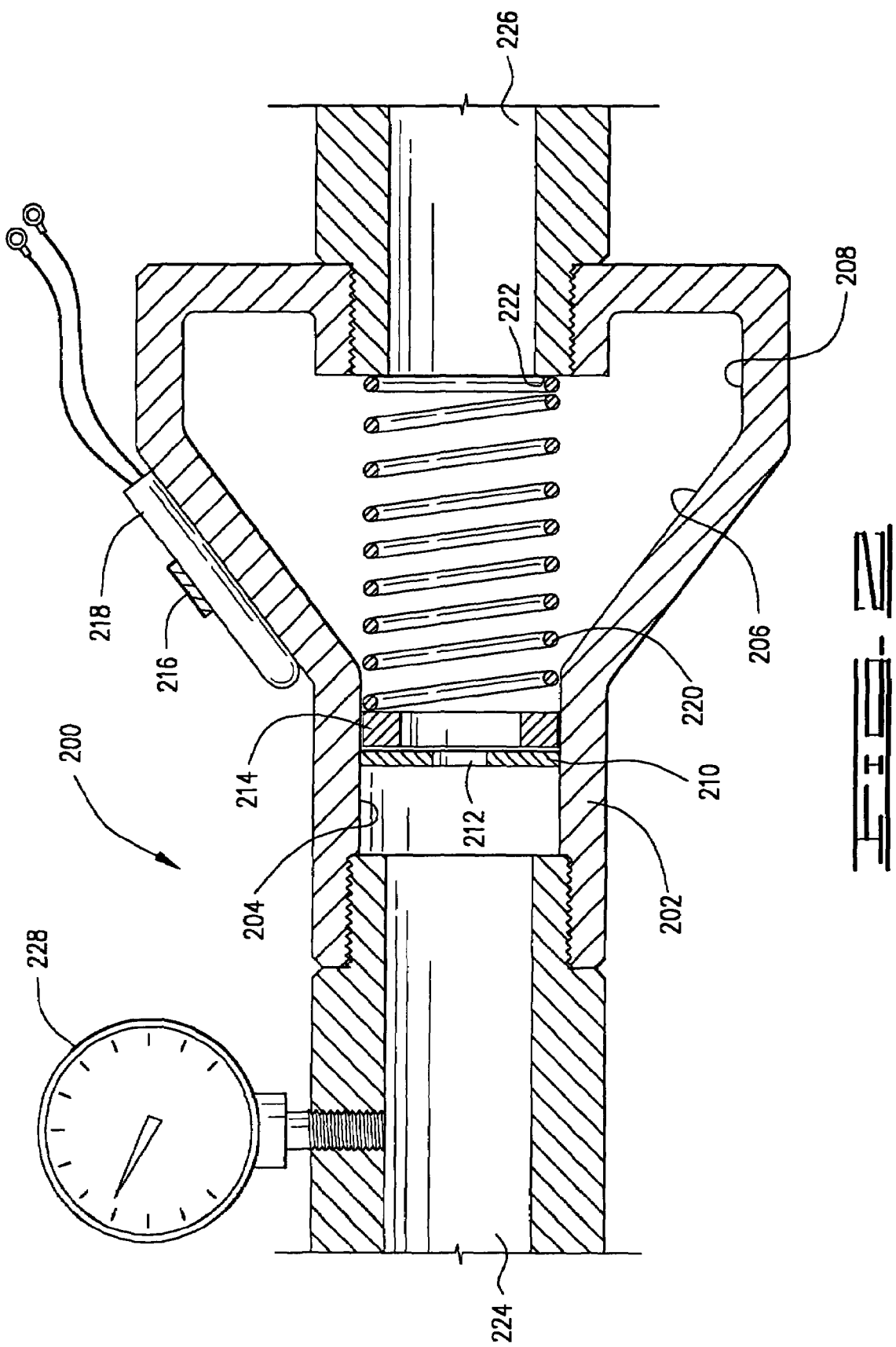
FIG. 2 is a cross-sectional view of another embodiment of the flow apparatus incorporating an enlarged section to accommodate increased flow.

FIGS. 1 and 2 reproduce drawings from U.S. patent application Ser. No. 08/450,535 filed Nov. 30, 1999 by the present Applicant. The device as previously described is a combination orifice flow meter/displacement magnetic flow sensor, which will be referred to herein as a flow sensor apparatus 100. The flow sensor apparatus 100 has an annular housing 102. A bushing 104 is adapted to be received at the outlet end 128 of the flow sensor apparatus 100. The bushing 104 defines a shoulder 124, the use for which will be described more fully later. Disclosed within the annular housing 102 is a moving orifice plate 106. The moving orifice plate 106 defines an opening 108 therein. Disposed about a periphery of the orifice plate 106 is a magnet 112, which is maintained in place in the particular embodiment shown by a magnet flange 110. A spring 114, also referred to as a biasing means, biases the magnet 112 and moving orifice plate 106 toward the inlet end 126 of the apparatus. A Reed switch 116 is held on an outside surface of the flow sensor apparatus 110 by an adjustable attachment means 118. The adjustable attachment means 118 is preferably simply a clip with screws that penetrate the annular housing 102. When the screws are loosened, the Reed switch can slide either towards the inlet end 126 or towards the outlet end 128. The moving orifice plate 106 has a front face 120 and a back face 122. The front face 120 faces toward the inlet end 126. The back face 122 faces towards the outlet end 128. The spring 114 is set against a shoulder 124 near the outlet end 128. Preferably, a pressure gauge 130 is disposed in communication with the fluid at the inlet end 126, and a flow gauge 132 is disposed in communication with the fluid near the outlet end 128.

FIG. 28 shows a device 2800 similar to the apparatus 100 shown in FIG. 1. The device 2800 has an annular housing 2802 with a bushing 2804 adapted to be received at each end thereof. Received within the annular housing 2802 is an orifice plate 2806 which can slidingly and sealingly move therein. The orifice plate 2806 has an opening 2808 defined therein. The annular housing 2802 has an inlet end 2826 and an outlet end 2828. A spring 2814 resting against a shoulder 2824 biases the orifice plate 2806 toward the inlet 2826. The face 2820 of the orifice plate 2806 faces the inlet 2826. A pressure gauge 2830 and a flow gauge 2832 are in full communication with the fluid inside the annular housing.

A first and second contact 2840 and 2842, respectively, indicate when the orifice plate, which is preferably conductive, is in direct physical contact with the bushing 2804a at the inlet end 2826. Other electrical contacts 2844, 2846, and 2848 are spaced along the length of an interior portion of the annular housing, for sending a signal when the orifice plate 2806 comes in contact therewith. The contacts, which are shown as points, may also be constructed as a wall segment in the interior of the annular housing. Thus, the moving orifice plate 2806 would be in contact with that segment of the wall until it moved past that wall segment in one direction or the other. The whole time it was in contact with the wall segment in question, it would be sending a signal indicating such contact to the a controller.

Also shown in the device 2800 are pressure sensors 2850 and 2852. The pressure sensors as shown are located on the shoulder 2824 in physical contact with the spring 2814. As the spring is biased backwardly by fluid flow therethrough, it places additional pressure on the sensors 2850 and 2852. The readout proportion of that pressure can be communicated to a controller, and the readout is directly proportional to the flow rate through the device.

Alternatively, a current can be passed through the spring on a consistent basis. As the compression of the spring changes, its resistivity will change as well. The change in resistivity can be directly proportional to the compression of the spring, indicating the displacement of the moving orifice plate. Thus, a readout of the resistivity of the spring can be directly related to the flow through the device.

As noted above, there are numerous other sensor means which could be used to determine the displacement of the moving orifice plate inside the annular housing. Such well-known technologies are intended to be incorporated within the spirit of the present invention.

The flow sensor apparatus 200 as shown in FIG. 2 is similar to the flow sensor apparatus shown in FIG. 1. However, the flow sensor apparatus in FIG. 2 is an expanding section 206 which allows, in addition to flow through the opening 212 and the moving orifice plate 210, for flow around the outside of the moving orifice plate 210 in the expanding section 206. Again, the device has an annular housing 202, including a fixed diameter section 204, an expanding section 206, and a largest section 208. The moving orifice plate 210 initially moves within the fixed diameter section 204, but as the flow increases it is displaced back into the expanding section 206 where the flow passes not only through the opening 212 but around the moving orifice plate 210. Again, a magnet 214 is disposed moving in conjunction with the moving orifice plate 210. An adjustable attachment means 216 is provided to attach a Reed switch 218 to an outer surface of the apparatus. A spring 220 again biases the moving orifice plate 210 and the magnet 214 towards the inlet 224. The spring 220 resting against a shoulder 222 near the outlet 226. As shown, only a pressure gauge 228 is provided in FIG. 2. However, a flow gauge as shown in FIG. 1 could also be provided. The device shown in FIG. 2 allows for larger flow rates through the device in times of greater flow demand, such as for fire protection needs.

Figure 3:
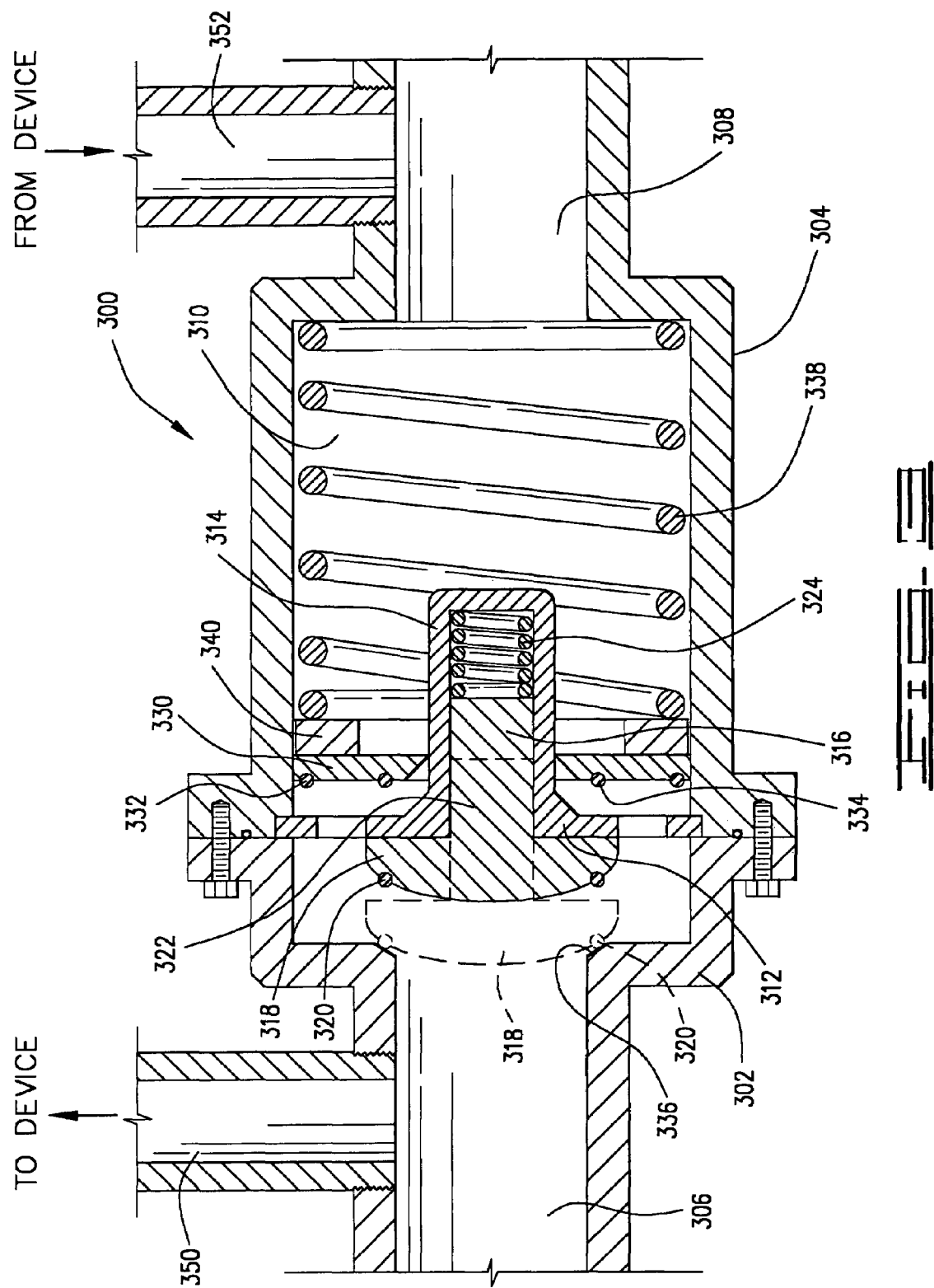
FIG. 3 is a cross-sectional view of a double check apparatus.

FIG. 3 illustrates a double check configuration of a flow sensor. The double check flow sensor 300 is generally shown in FIG. 3. It is comprised of substantially a first housing portion 302 and a second housing portion 304. At an end of the first housing portion 302 is a main inlet port 306, and a main outlet port 308 is disposed at an end of the second housing portion 304. In cooperation, the first housing portion 302 and second housing portion 304 define a chamber 310 therein. Disposed in the chamber 310 is a bullet port 312 integrally connected to a bullet rod 314. The bullet rod 314 defines therein a cylinder 316. A moving check 318 has a check piston 322 which is slidingly received within the bullet cylinder 316. A check o-ring 320 is disposed on the moving check 318 for sealing against the check shoulder seat 336. A check spring 324 disposed in the bullet cylinder 316 biases the moving check 318 towards the check shoulder seat 336. Disposed between the bullet port 312 and the main outlet port 308 is a moving orifice plate 330. On the moving orifice plate 330 are an outer orifice o-ring 332 and an inner orifice o-ring 334. An orifice spring 338 biases the orifice plate 330 in cooperating a magnet 340 towards the main inlet port 306, and away from the main outlet port 308. As shown, the sensor 300 includes a device outlet port 350 and a device return port 352. These ports allow the sensor to normally divert flow through an external device such as a water softener, ut to allow bypassing the device when there is a demand that exceeds the flow capacity of the device.

Preferably, the spring 338 has a sufficient resistance to compression that it maintains the orifice plate 330 in firm contact with the bullet port 312, preventing any flow therethrough until a specified pressure drop is placed on the device. For example, it may be desirable to have a pressure drop of ten pounds before any fluids can pass through the sensor. In that case, the spring 338 might maintain the orifice plate 330 in firm sealing contact with the bullet port 312 until a pressure of eight pounds, for example, is noted. Thus, the orifice plate 330 would not begin to move away from the bullet port until at least eight pounds of pressure drop was placed upon it. This feature is desirable because there is a slight bypass around the periphery of the orifice plate 330 and around the interior of the orifice plate once it moves away from sealing contact with the bullet port 312. This bypass may be from five to fifteen percent, but it does result in some non-softened water bypassing the system and proceeding on to domestic or other uses.

The moving check 318 is generally shown in FIGS. 4 through 6. FIG. 4 is a cross-sectional view of the moving check 318. It incorporates a leading edge 400, as well as a piston end 402 opposite from the leading edge 400. A shoulder 404 is also defined. A periphery 406 extends around the terminal portion of the leading edge 400. The check piston 322 is sized to be slidingly received within the bullet cylinder 316. The check o-ring 320 is sized so as to sealingly seat against the check shoulder seat 336. FIG. 5 is a front view of the moving check 318 showing the leading edge 400 and the check o-ring 320. FIG. 6 is a rear view of the moving check 318 showing a shoulder 404 and the piston end 402.

FIGS. 7 through 9 illustrate the moving orifice plate 330. FIG. 7 is a detailed cross sectional view of the moving orifice plate 330. The first face 700 faces the main inlet port 306. Disposed thereon are an outer orifice o-ring 332 and an inner orifice o-ring 334. A second face 702 is opposite the first face 700. An orifice 704 passes from the first face 700 to the second face 702, defining a hole therethrough. The orifice 704 is sized to slidingly receive the bullet rod 314 therein.

FIGS. 10 through 12 generally illustrate the bullet port 312. FIG. 10 is a detailed cross sectional view of the bullet port 312. An outer annular ring 1000 and an inner support ring 1002 are generally shown. Extending away from the inner support ring 1002 is the bullet rod 314. The outer annular ring 1000 defines an outer seat 1004, and the inner support ring 1002 defines an inner seat 1006. The outer orifice o-ring 332, and the inner orifice o-ring 334 are designed to sealingly engage the outer and inner seats 1004 and 1006, respectively. At a terminal portion of the bullet rod 314, a rod end 1008 is defined. It is anticipated that the rod end 1008 will be closed, though there may be a hole therethrough to allow the check piston 322 to freely move within the bullet cylinder 316 without creating a vacuum. FIG. 11 is a front view of the bullet port 312 showing the support legs 1100, and the flow holes 1102 defined by void spaces surrounded by the support legs 1100, the outer annular ring 1000 and the inner support ring 1002. FIG. 12 is a back view of the bullet port 312, again showing the same features, as well as showing the rod end 1008.

FIG. 13 illustrates an alternative embodiment of a double check flow sensor. As shown in FIG. 13, a nylon-coated magnet 1330 serves both as the source of the magnetic field and as the moving orifice plate—a combination orifice plate/magnet 1330. The flow sensor 1300 is comprised of a first housing portion 1302 and a second housing portion 1304. Defined within the two housing portions is a chamber 1310 with a main inlet port 1306 and a main outlet port 1308. A bullet port 2112 is fixed at a juncture between the first and second portions 2102 and 2104. The bullet port 1312 incorporates a bullet rod 1314 extending outwardly therefrom. Defined within the bullet rod is a bullet cylinder 1316 for slidingly receiving the check piston 1322 portion of a moving check 1318. A check o-ring 1320 is disposed on the moving check for sealing engagement with a check shoulder seat 1336. An orifice/magnet spring 1338 is disposed within the chamber 1310 for biasing the orifice plate/magnet 1330 toward the main inlet port 1306 and away from the main outlet port 1308. The orifice plate/magnet 1330 is coated with a rubber/polymer material. It seals against the outer seating surface 1332 and the inner sealing surface 1334 of the bullet port 1312. Similarly, a check spring 1324 is disposed in the bullet cylinder 1316 for biasing the moving check 1318 toward the main inlet port 1306 and away from the main outlet port 1308. A Reed switch 1340 is shown disposed on an outer wall of the second housing portion 1304.

Figure 14:
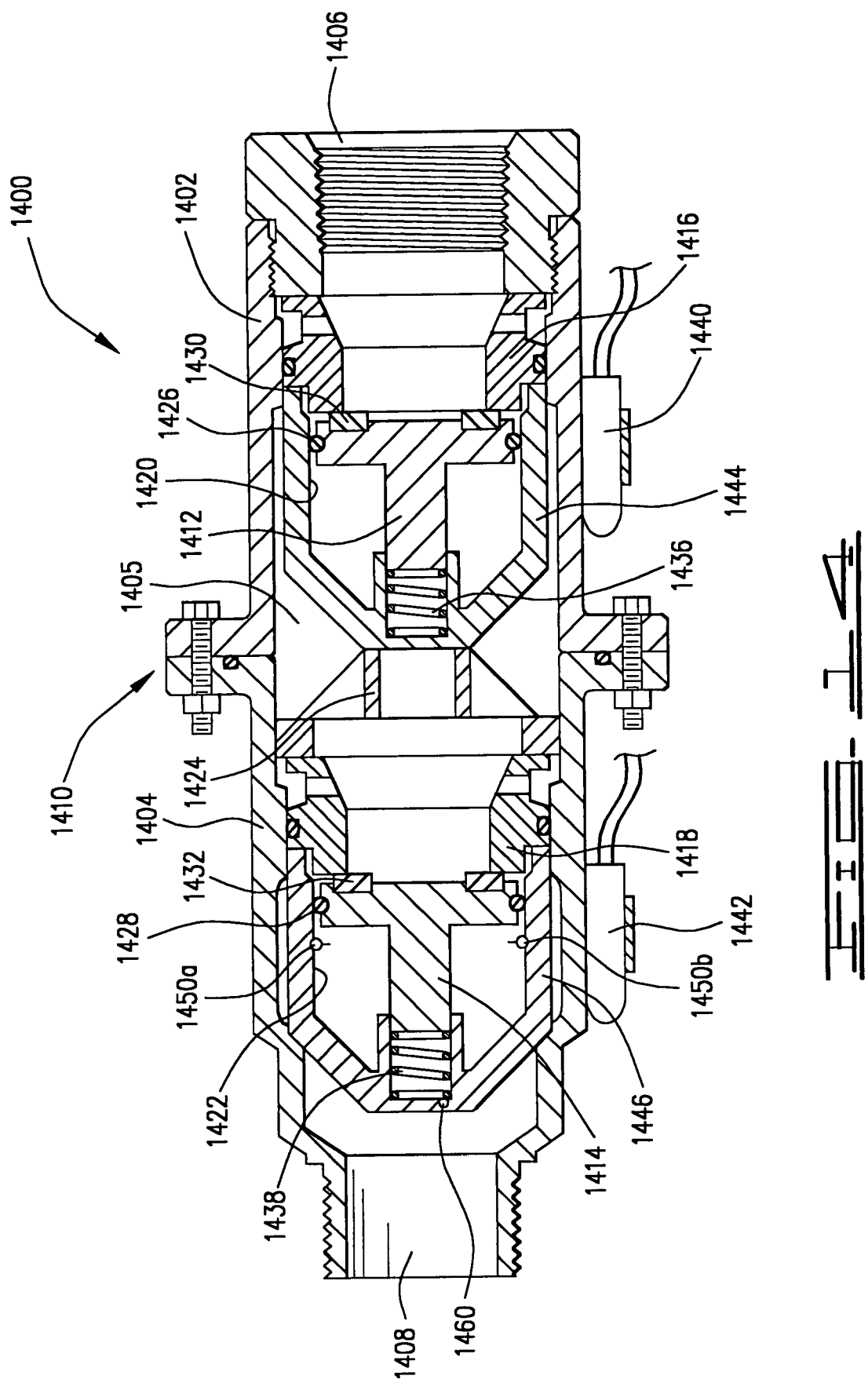
FIG. 14 is a cross-sectional view of another embodiment of a double check valve.
Figure 15:
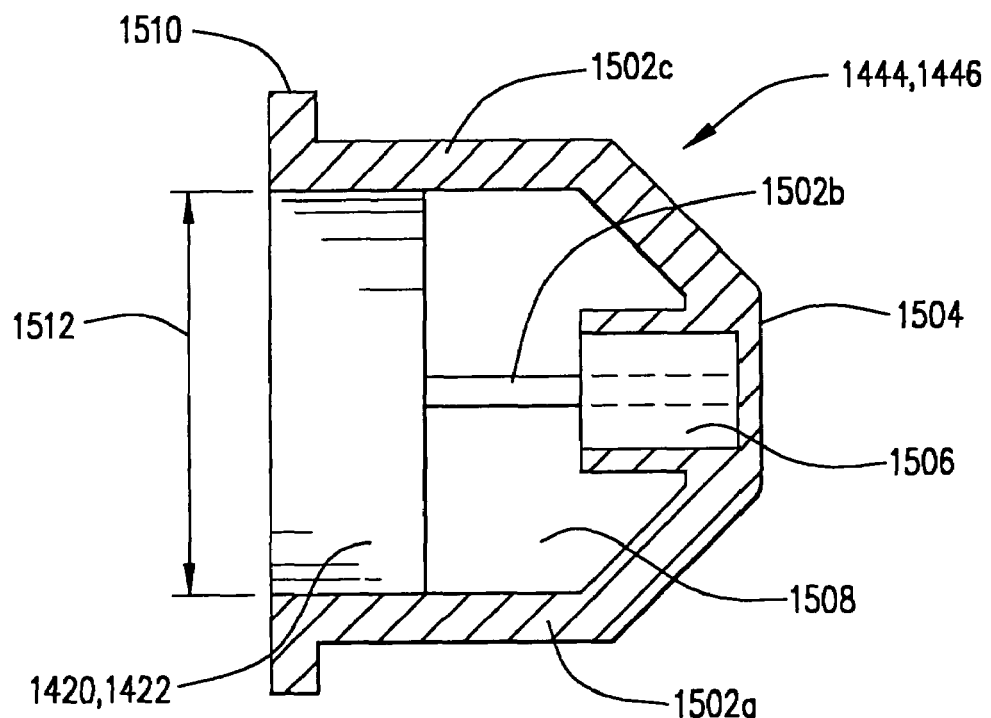
FIG. 15 is a detailed cross-sectional view of a check cage used in the double check valve of FIG. 14.
Figure 16:
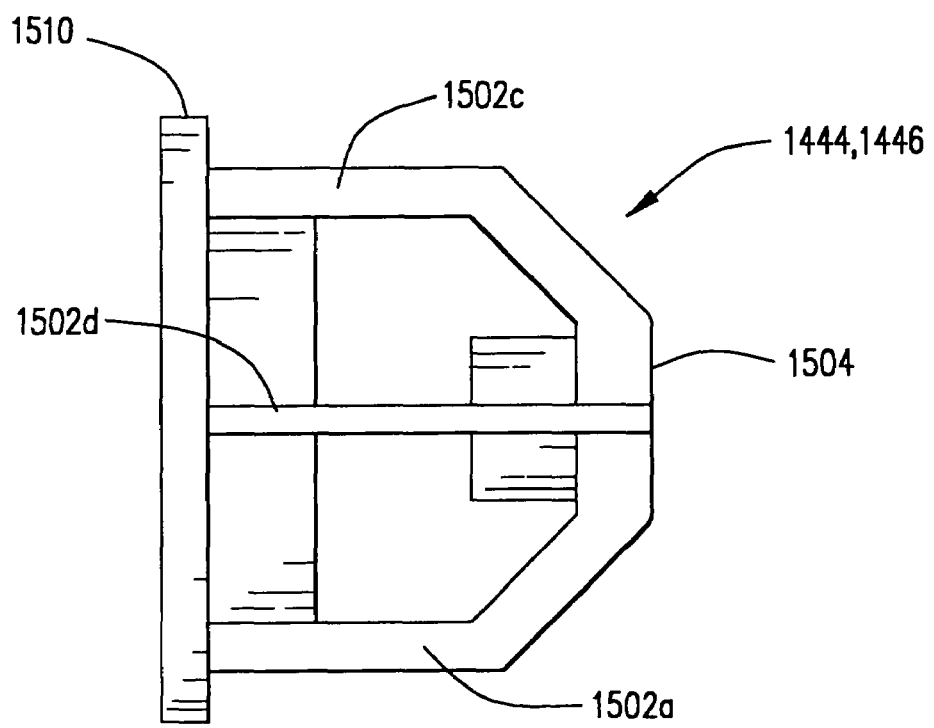
FIG. 16 is a detailed side view of the check cage.

Another embodiment of the double check type apparatus and related components are shown in FIGS. 14 through 21. A double check flow sensor apparatus 1400 is generally shown in FIG. 14. The flow sensor apparatus 1400 is comprised of a first annular housing portion 1402 and a second annular housing portion 1404. Defined in the first annular housing portion 1402 is an inlet 1406, and similarly an outlet 1408 is defined in the second annular housing portion 1404. The two pieces are connected by a flange connection means 1410. The two housing portions 1402 and 1404 cooperate to define a chamber 1434 therein. As shown, the flange connection means 1410 is simply two flanges, one of which has an o-ring embedded therein and the other having a smooth seating surface attached with one or more flange bolts. The invention also incorporates other means for releasably attaching two fittings such as are well known in the prior art.

Two internal checks are disposed within the chamber defined by the first annular housing portion 1402 and the second annular housing portion 1404. The first internal check 1412 is the first to be encountered by fluid flowing inward from the inlet 1406. The second internal check 1414 is the next to be encountered by fluid flowing inward from the inlet 1406. The first check 1412 seats against the first seat 1416, and the second check 1414 seats against the second seat 1418. A first check o-ring 1426 is disposed about a periphery of the first check 1412, and a similar second check o-ring 1428 is disposed around a periphery of the second check 1414. The purpose of the o-rings is to seat against an internal surface of a first and second cylinder, 1420 and 1422, respectively. A first magnet 1430 is disposed on the first check 1412 and a second magnet 1432 is disposed on the second check 1414.

As shown, the first magnet 1430 and the second magnet 1432 (which are coated with a polymer) form the sealing surfaces which seal against the first and second seats 1416 and 1418. Those checks are biased towards the inlet end 1406 by a first spring 1436 and a second spring 1438. The checks are contained within check cages 1444 and 1446. A first Reed switch 1440 and a second Reed switch 1442 are adjustably affixed to the first and second annular housing portions 1402 and 1404, respectively. As the internal checks 1412 and 1414 are displaced away from the inlet 1406 by fluid flow, they can activate the Reed switch depending on the setting of the Reed switch and the flow therethrough. The Reed switch adjustment is simple, consisting of moving the Reed switch closer toward the inlet end or farther away therefrom as needed.

The same type of device could be made with only a single check. The double check is provided because many fire protection standards require a double check, and they provide an additional level of security to ensure that the fluid flow will in fact be checked from flowing in the undesired direction.

Also shown in FIG. 14 are a couple of alternative sensor embodiments. 1450a and 1450b are contact points, which come into electrical contact with the second check 1414 as it moves backwardly towards the outlet 1408 from the device. This type of electrical contact can be used to give a back up or alternative indication of the location of the check within the device. Another alternative sensor mechanism, to-with: a pressure transducer 1460 is shown as well in FIG. 14. The pressure on the transducer 1460 is directly proportional to the flow rate through the apparatus, and can be used as an alternative or redundant check of the flow therethrough.

Figure 17:
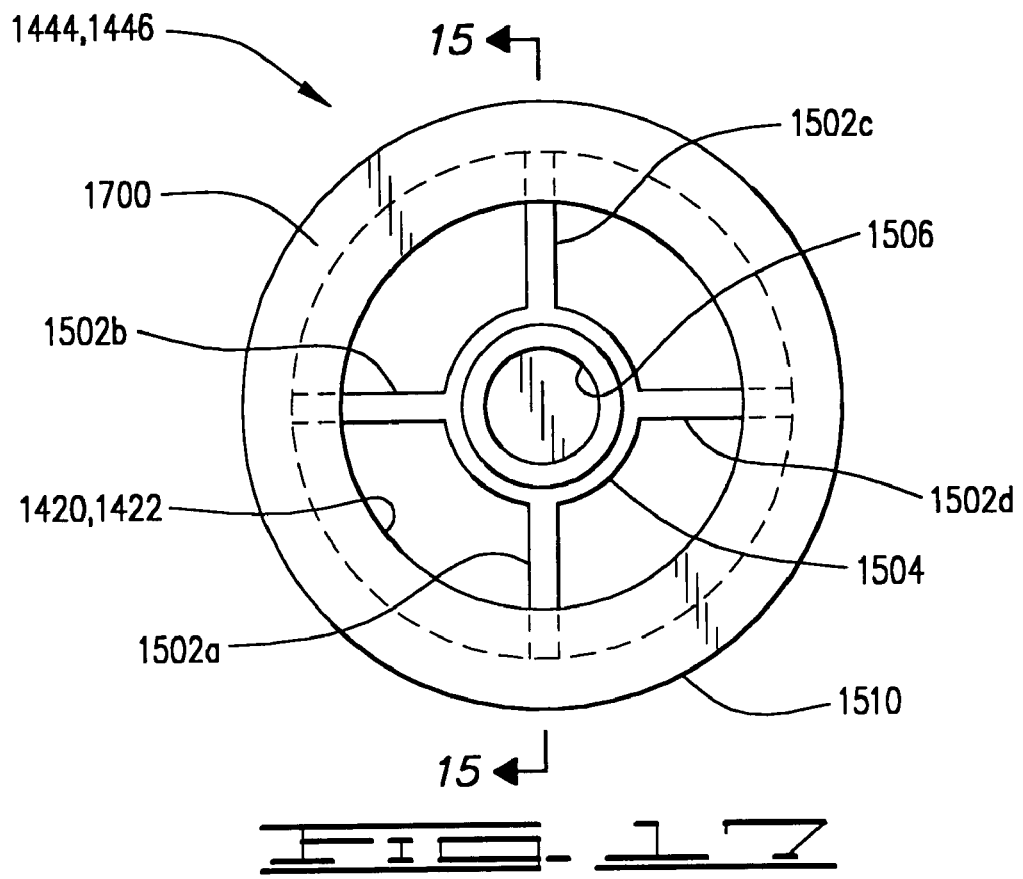
FIG. 17 is a detailed front view of the check cage.
Figure 18:
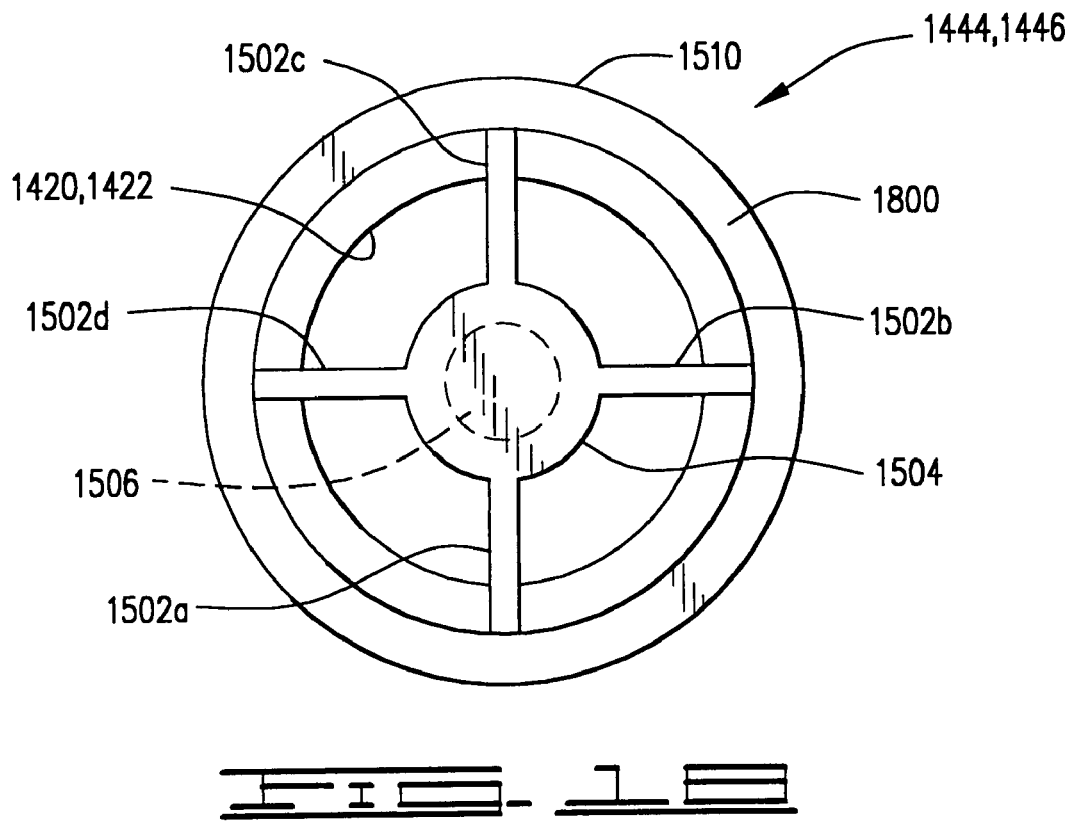
FIG. 18 is a detailed back view of the check cage.

FIGS. 15 through 18 are detailed drawings of the check cages 1444 and 1446. As shown, each check cage has a first and second cylinder portion 1420 and 1422. The cylinder portions have an internal diameter 1512 with a smooth bore. Legs 1502 lead from the cylinder to a back end 1504. Attached to the back end 1504 is housing 1506 for receiving check springs 1436 and 1438. Port openings 1508 are defined between the legs 1502 and allow fluid to pass through the check cages 1444 and 1446. A flange 1510 is defined at a terminal end of the cylinder portion 1500 for fixing the check cages 1444 and 1446 in place. In FIG. 17, it can be seen that a flange face 1700 faces the incoming fluid. The housing 1506 can also be seen in FIG. 17. In FIG. 18 the legs 1502, as well as the back end 1504, can be seen, as well as the flange shoulder 1800.

Figure 19:
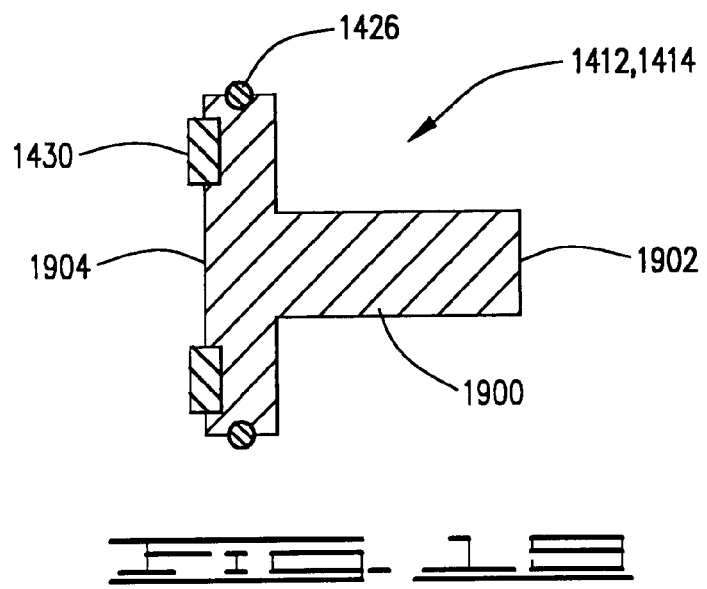
FIG. 19 is a detailed cross-sectional view of the moving check adapted to be housed within the check cage.
Figures 20, 21:
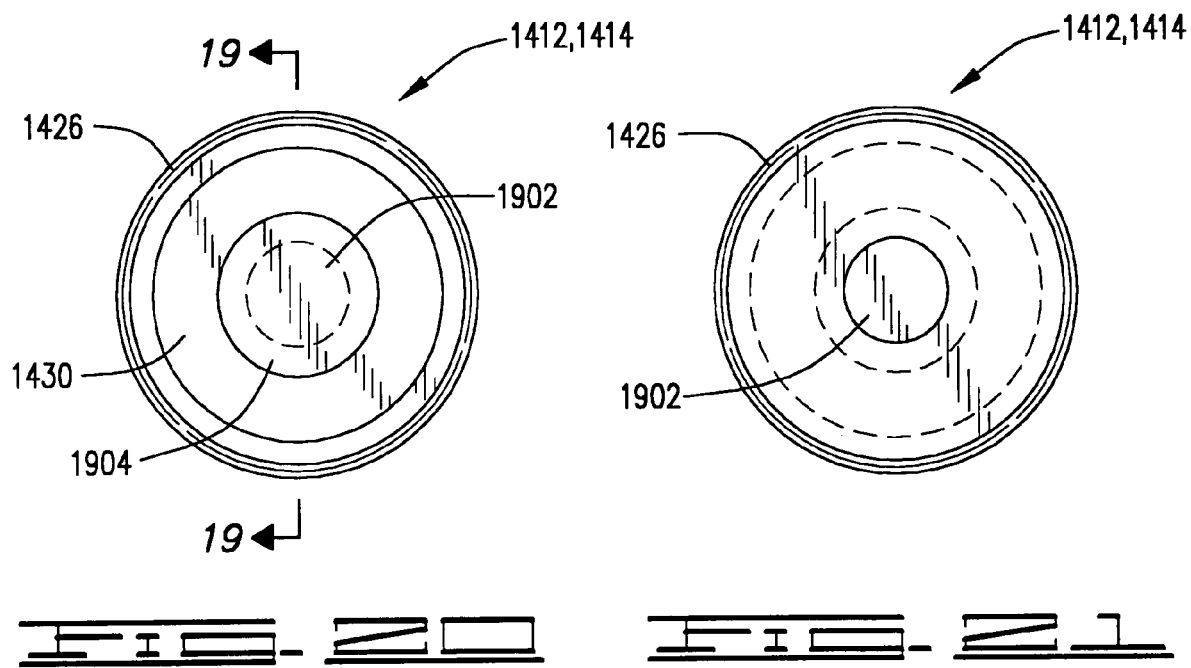
FIG. 20 is a detailed front view of the moving check.
FIG. 21 is a detailed back view of the moving check.

FIGS. 19 through 21 are detailed drawings of the first internal check 1412 and second internal check 1414. As shown in FIG. 19, the internal check includes a check piston portion 1900 having a terminal end 1902. A leading end 1904 receives the magnets 1430 and 1432. Around a periphery of the leading end 1904, the check o-ring 1426 and 1428 is disposed. The diameter of the leading end 1904 is such that the check o-ring 1426 and 1428 is adapted to sealingly and slidingly engage the internal diameter 1512 of the cylinders 1420 and 1422. The check piston 1900 is adapted to be slidingly received within the housing 1506. The springs 1436 and 1438 press against the terminal end 1902 biasing the internal check towards the inlet end 1406 of the apparatus 1400.

Figure 22:
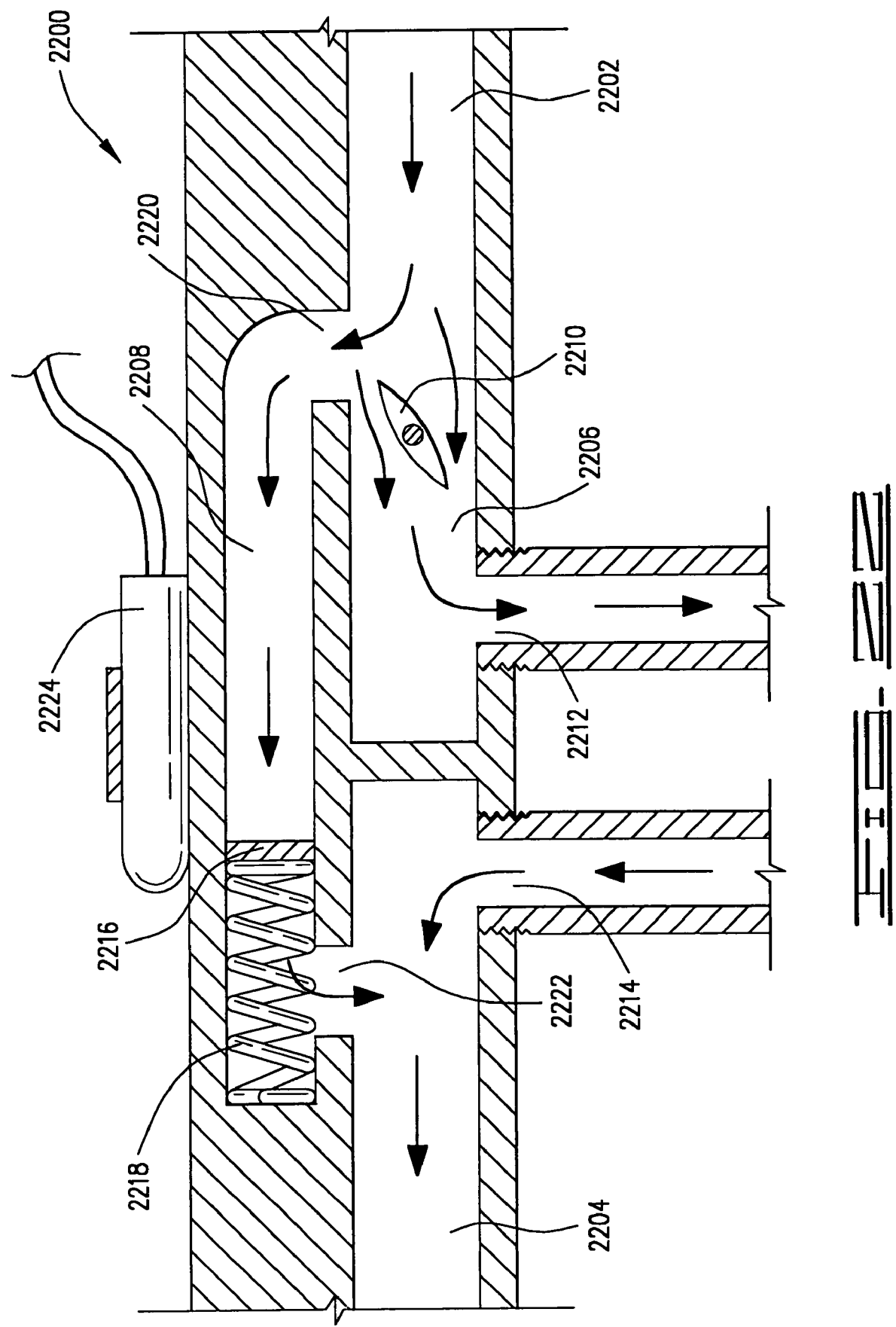
FIG. 22 is a cross-sectional view of another apparatus embodying present invention incorporating an adjustable vane to cause diversion of flow.

An alternative embodiment of an apparatus embodying the concepts of the present invention is illustrated in FIG. 22. FIG. 22 shows the vane-type flow sensor apparatus with a bypass mechanism 2200. The apparatus includes an inlet 2202 and an outlet 2204. The main flow path 2206 flows from the inlet 2202 through a device outlet 2212, through an external device (such as a water softener) or a bypass tube and back into the device through the device inlet 2214, and subsequently out of the device through the outlet 2204. A bypass flow path 2208 allows fluid to flow in the bypass inlet 2220, past a moving magnet 2216 and out the bypass outlet 2222, and subsequently out of the device through the outlet 2204. A vane 2210 is disposed within the main flow path 2206, and can be rotated to force an increased pressure drop across the vane 2210 forcing more of the fluid to flow through the bypass flow path 2208. If desired, the vane 2210 can be completely closed off preventing any flow through the main flow path 2206. The bypass flow path and moving magnet generally blocks the flow of fluid therethrough until the spring 2218 and the moving magnet 2216 are biased sufficiently towards the outlet 2204 that fluid can pass through the bypass outlet 2222. A Reed switch 2224 mounted on an external portion of the apparatus is activated when the moving magnet 2216 comes into sufficiently close proximity to the sensor portion of the Reed switch 2224.

Figure 23:
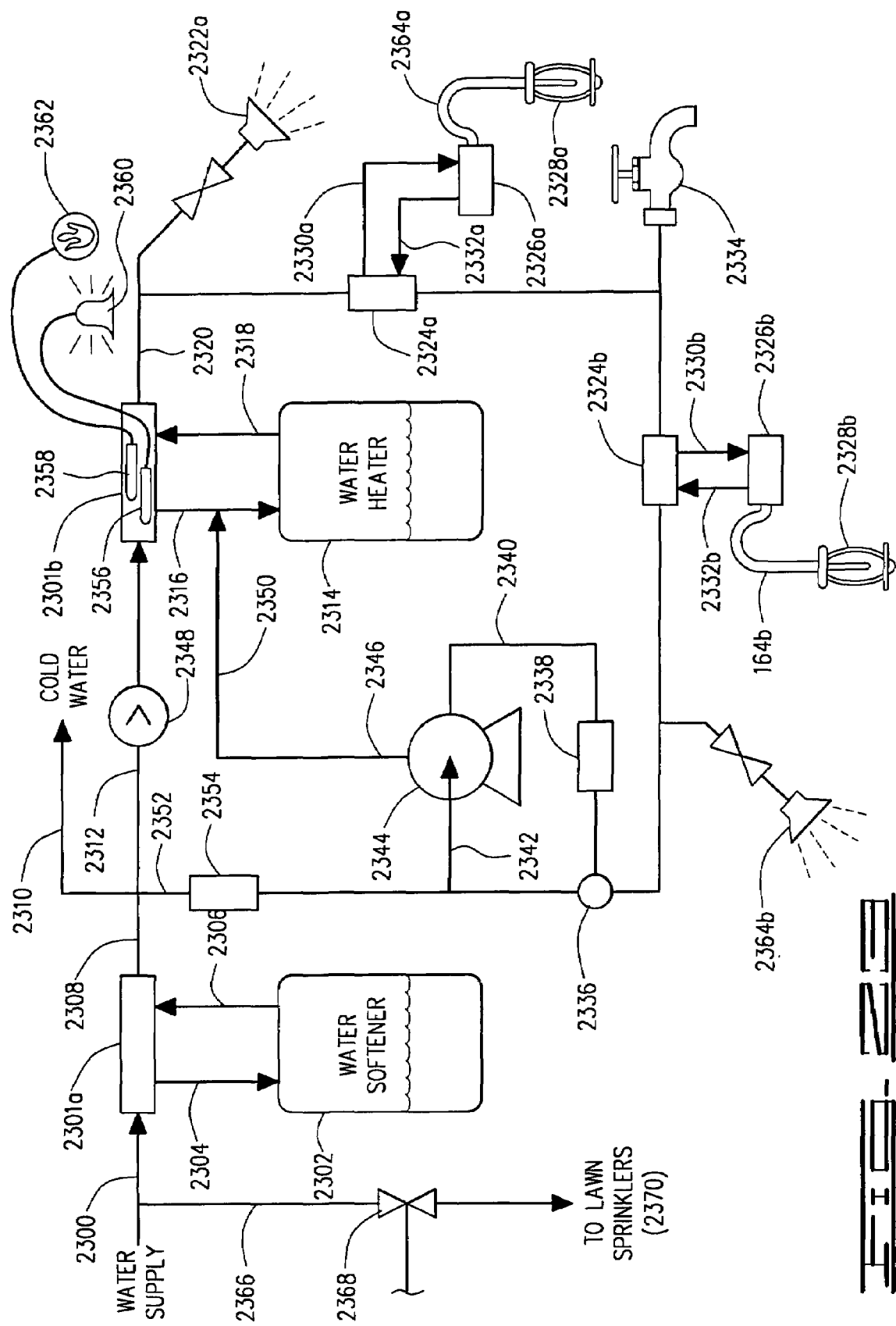
FIG. 23 is a schematic view of a fire protection system incorporating both domestic uses and the flow apparatus described in the present invention.

One embodiment of a fire protection system incorporating all apparatus of the present invention is illustrated in FIG. 23. The water from the water supply 2300 first flows through a flow sensor 2301a passing through an inlet softener line 2304 to a water softener 2302 or similar water treatment or processing device and thence through the outlet softener line 2306 back through the flow sensor 2301a. The flow sensor 2301a typically directs water through the inlet softener line 2304 through the water softener 2302 and then back through the sensor to a first pipe section 2308. The flow sensors 2301a and 2301b could be of the type shown in FIG. 22. Alternatively, the device could be any of the type of devices disclosed in the parent application. However, whether there is an excessive water demand in the system, for example such as one caused by the operation of a fire protection sprinkler, there is a mechanism incorporated in the flow sensor 2301a which allows water to bypass the water softener 2302 increasing the flow rate through the system. The water, which is passed through the water softener 2302, is next split, some of it passing into the cold water piping 2310, and the rest of it passing into a second pipe section 2312.

The water from the second pipe section 2312 next passes through a second flow sensor 2301b. A check valve 2348 may also be incorporated in the second pipe section 2312. The check valve 2348 prevents back flow of water, which potentially could be stagnant from the fire protection system, to the cold water piping and/or the water softener. If a check valve is used, it could be any of the check valves shown in FIGS. 3 through 21, whether in single or double check configuration. The type of device shown in FIGS. 3, 13, and 14 could be used as both a check valve and the flow sensor, 2348, 2301a, and 2301b, respectively. This would require adding the device inlet and outlet ports as shown on the flow sensors 2301a and 2301b. The second flow sensor 2301b passes water down through a water heater 2314 via an inlet heater line 2316, and back to the sensor via an outlet heater line 2318. Again, the second flow sensor 2301b incorporates a bypass means which allows water to bypass the water heater where there is an excessive demand. After being heated, the water passes into a multi-purpose pipe section 2320. Attached to the multi-purpose pipe section 2320 are typical domestic uses such as a shower head 2322 and a faucet 2334. Other uses, such as toilets, dishwashers, washing machines, and the like may also be attached to the multi-purpose pipe section 2320. Also in communication with the multi-purpose pipe section 2320 are one or more sprinkler heads 2328. Sprinkler heads are in communication via a passive pump 2324 and a head fitting 2326 with a multi-purpose pipe section 2320. The operation of the passive pump 2324 in cooperation with the head fitting 2326 and the sprinkler heads 2328 will be more fully described hereinafter. However, the purpose of the passive pump is to utilize the velocity head of water flowing through the multi-purpose pipe section 2320 to circulate water to and around the sprinkler heads 2328 to minimize stagnation.

Two flow sensors are incorporated into the multi-purpose piping system. If there is no water softener, there will not be a need for the flow sensor 2301a. The only flow sensor 2301b will be on the hot water heater. Alternatively, it may be desirable to have only one flow sensor present at the water softener. In such a case, the flow sensor at the water softener will also measure the cold water flow, potentially contributing to more false alarms in the multi-purpose alarm system. However, this may be desirable where the risk of false alarms is not substantial, and the cost savings is sufficient enough to justify a single sensor at the water softener only. It is not believed that the hot water heater will cause a significant pressure drop in the flow therethrough. Therefore, the bypass means at the hot water heater is not believed to be necessary to ensure that adequate flow is available for fire protection needs. Rather, as shown, the advantages that the flow sensor placed on the hot water heater only measures the flow through the hot water domestic uses, as well as the flow to the fire protection sprinklers. Thus, the chance of a false alarm is minimized.

From the passive pump 2324, water is passed to a head fitting 2326. The water passes to the head fitting 2326 from the multi-purpose pipe section 2320 via the head supply line 2330. It is returned to the multi-purpose pipe section 2320 via the head return line 2332. A reverse-j fitting 2364 supplies water from the head fitting 2326 to the sprinkler head 2328. The purpose of the reverse-j fitting 2364 is to cool the water supplied to the sprinkler head 2328 to insure that the sprinkler head is not activated by the temperature of the water supplied thereto. Most sprinkler heads are set to activate at a temperature of 155° Fahrenheit. While it is not anticipated that hot water flowing through the multi-purpose piping system will exceed that temperature, the reverse-j fitting 2364 helps to insure that, just in case the water does exceed that temperature, the fire sprinkler is not inadvertently activated by the temperature of water passing thereto.

As shown, a thermocouple 2336 in communication with the pump controller 2338 and control wiring 2340 operates to ensure that a minimum desired temperature is maintained in the common piping 2320. The thermocouple 2336 measures the temperature of water in the common piping 2320. The temperature of surrounding air could also be measured either in place of or in addition to measurement of the water temperature is measured it may be desirable to leave the pump running continuously, placing extra wear and tear plus electrical costs on the system. If the temperature of the water drops below a preselected level (preferably at least 40° Fahrenheit), the pump controller 2338 initiates the action of a pump 2344. The pump 2344 draws water from the common piping via a pump inlet pipe 2342. A pump outlet pipe 2346 directs water through a check valve and a return pipe 2350 so that it is recycled through the water heater 2314. The return pipe 2350 connects to the inlet heater line 2316 to complete the circuit. Thus, water moved by the pump 2344 through the water heater 2314 is reheated to maintain a minimum temperature in the multi-purpose pipe section 2320.

An alternative feature is also shown in FIG. 23. The alternative feature is a return leg supply pipe 2352 and a return leg flow sensor 2354. The return leg supply pipe 2352 may be in communication with the first pipe section 2308. The return leg flow sensor 2354 normally prevents any water from flowing directly from the first pipe section 2308 through the return leg supply pipe 2352 into the multi-purpose pipe section 2320. However, when an excessive water demand is made on the multi-purpose pipe section 2320, the pressure may drop low enough so that the return leg flow sensor 2354 allows water to pass there through directly from the first pipe section 2308, supplementing the flow sensor 2301b and the other elements of the water heater system. Alternatively, the return leg flow sensor 2354 may draw water from the multi-purpose pipe section 2320 at a point adjacent to the outlet from the flow sensor 2301b.

As used herein, the multi-purpose pipe section 2320 will often be referred to as "common piping." The "common piping" may include the second pipe section 2312, the inlet heater line 2316, the outlet heater line 2318, the multi-purpose pipe section 2320, the pump inlet pipe 2342, the pump outlet pipe 2346, as well as the flow sensor 2301b. Further, in the embodiment shown in FIG. 23, the common piping includes all piping elements excluding the cold water system, and also excluding piping related to the water softener system. As noted above, in some circumstances it may be desirable to have the flow sensor with the fire alarm enunciation means located at the water softener. Where the flow sensor with the fire alarm enunciation means is located at the water softener, the term "common piping" will include the cold water piping, as well as the piping related to the water softener.

The flow sensor 2301b incorporates a trouble Reed switch 2356 and a fire Reed switch 2358. An alarm annunciator is in electronic communication with the trouble alarm 2360 and a fire alarm 2362. Preferably, the fire alarm 2362 will also have a remote notification feature, which could advise the fire department, for example, that a fire alarm condition exists in the structure. As shown, as a differential in the linear placement of the fire Reed switch 2358 compared to the trouble Reed switch 2356. The remote notification feature will incorporate the use of a modem or other electronic dialing means to notify the police and play, for example, a pre-recorded message notifying the police and/or fire department of the fire alarm condition in the structure.

American Air Filter promoted a system called a "Tri-Water System" in the early 1980's. The Tri-Water System was intended for installation primarily in a commercial, and more particularly in a multi-story commercial, structure. The Tri-Water System would have allowed for a great deal of savings, combining the heating and air conditioning systems with a fire sprinkler system, and reducing the amount of piping required for a commercial structure. The promoters of the Tri-Water System claimed that flow switches were available which would have allowed for a water flow alarm, but this was untrue. Due to the fact that no water flow alarm was available for these systems, they fell from favor, and have not been installed very widely.

Figure 24:
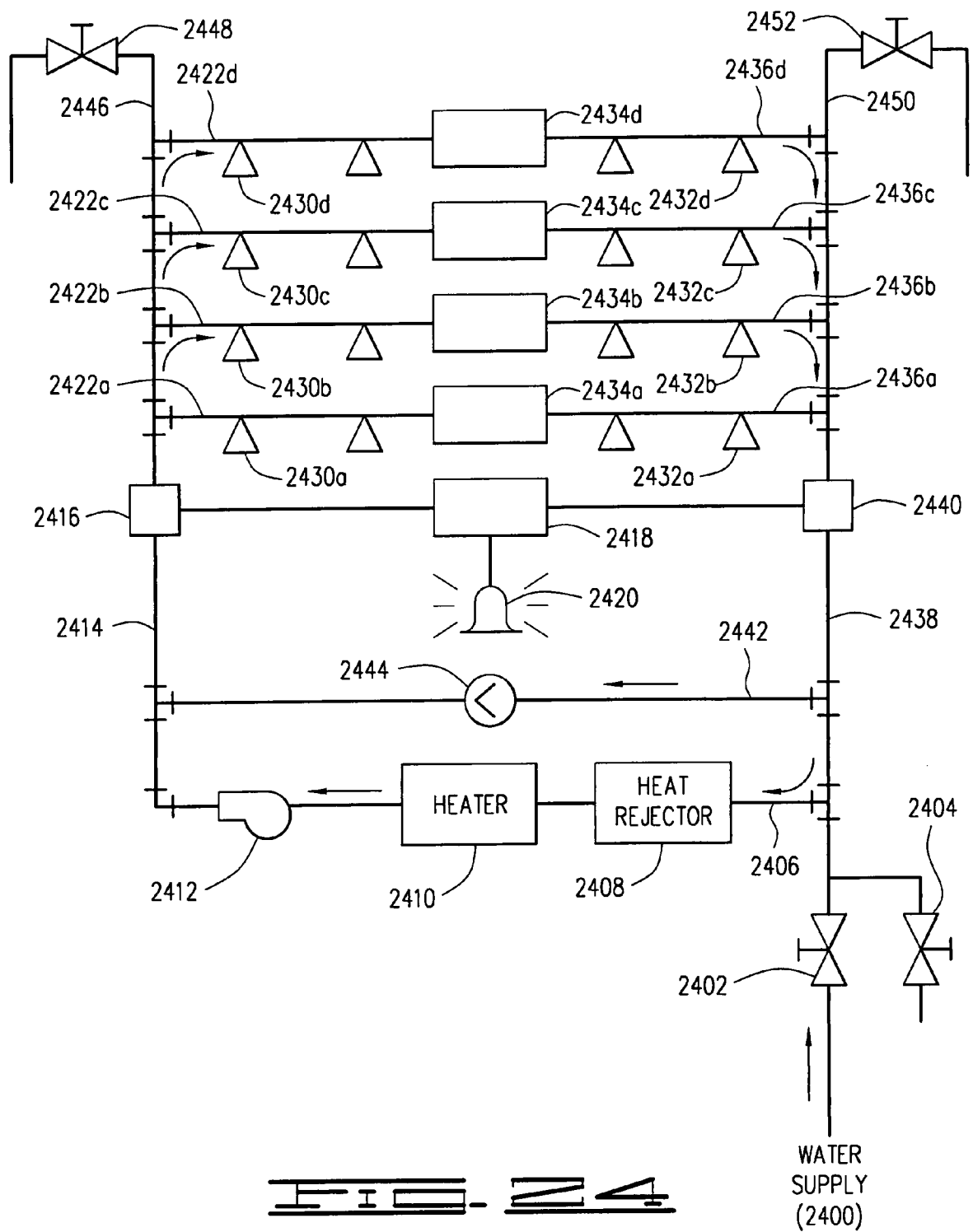
FIG. 24 is a schematic view of a "tri-water" system incorporating the apparatus of the present invention.

FIG. 24 illustrates an adaptation of the Tri-Water System to incorporate the improvements of the apparatus disclosed in the present invention. The system is provided with a water supply 2400. The water supply will have to be of the type typically provided for fire sprinkler systems. There is a main shut off valve 2402 which can be used to shut off the supply of water to the system, but which is normally left open. Preferably, the main shut off valve 2402 will be connected to the alarm systems so if it is inadvertently shut off, an alarm will sound indicating the flow of water to the fire protection system has ceased. Also provided at or near the supply point is a drain valve 2404. This allows the system to be drained of water in the event repairs are needed or the like. Water flows into an inlet line 2406, which passes it through a heat rejector 2408. The purpose of the heat rejector is to remove heat from the fluid circulating through the system. This is in effect the chiller for the cooling system. Water next passes through the heater 2410 where it can be warmed if the system is operating in a heating mode. The flow of the water through the system is forced by a pump 2412 disposed after the heater. After leaving the pump 2412, the water flows through a supply line 2414. Preferably, a first flow sensor 2416 is disposed in the supply line 2414. The first flow sensor 2416 is in electronic communication with a controller 2418, which controls an alarm 2420. After passing through the first flow sensor 2416, the supply line 2414 branches off into a number of supply branches. As shown, there are four supply branches 2422a through 2422d. In a multi-story commercial application, there will be at least one branch for each floor of the commercial structure. Also, there may be multiple branches per floor. Disposed on the supply side of each branch 2422a through 2422d is at least one supply side sprinkler 2430. After flowing through supply branches, water passes through heat exchangers 2434. The purpose of the heat exchangers is to distribute cooled or heated air, as needed, throughout the portion of the structure served by the heat exchangers 2434. After passing through the heat exchangers 2434 fluid flows through respective return branches 2436a through 2436d. Disposed on each return branch is at least one return side sprinkler 2432. The flows from the various return branches 2436a-d are collected in the return line 2438. Eventually they return to the inlet line 2406 and the circulation process repeats itself.

On both a supply test line 2446 is provided which allows fluid to be drained from the supply side through a supply test valve 2448. Similarly, a return test line 2450 is in communication with the return line and allows fluid to flow out through a return test valve 2452. The purpose of these valves is twofold: first, to allow fluid to be drained from the respective supply and return piping; and second, to allow simulation of operation of at least one sprinkler on both the supply and return side.

A bypass leg 2442 is provided to allow a short circuit of fluid from the return leg, which is directly fed by the water supply 2400 to the supply line 2414, bypassing the heat rejector 2408, heater 2410, and pump 2412. A check valve 2444 is disposed in the bypass leg 2442 to prevent back flow during regular heating/cooling operations of the device.

In cooperation the first flow sensor 2416, the controller 2418, and the second flow sensor 2440 allow for creation of a flow alarm to determine whether one or more fire sprinklers have activated. Testing and calibration of this system can be accomplished by utilizing the supply test valve 2448 and the return test valve 2452.

Preferably, the pump 2412 and the heat exchangers 2434 will be de-activated if a fire sprinkler activation is detected.

Figure 25:
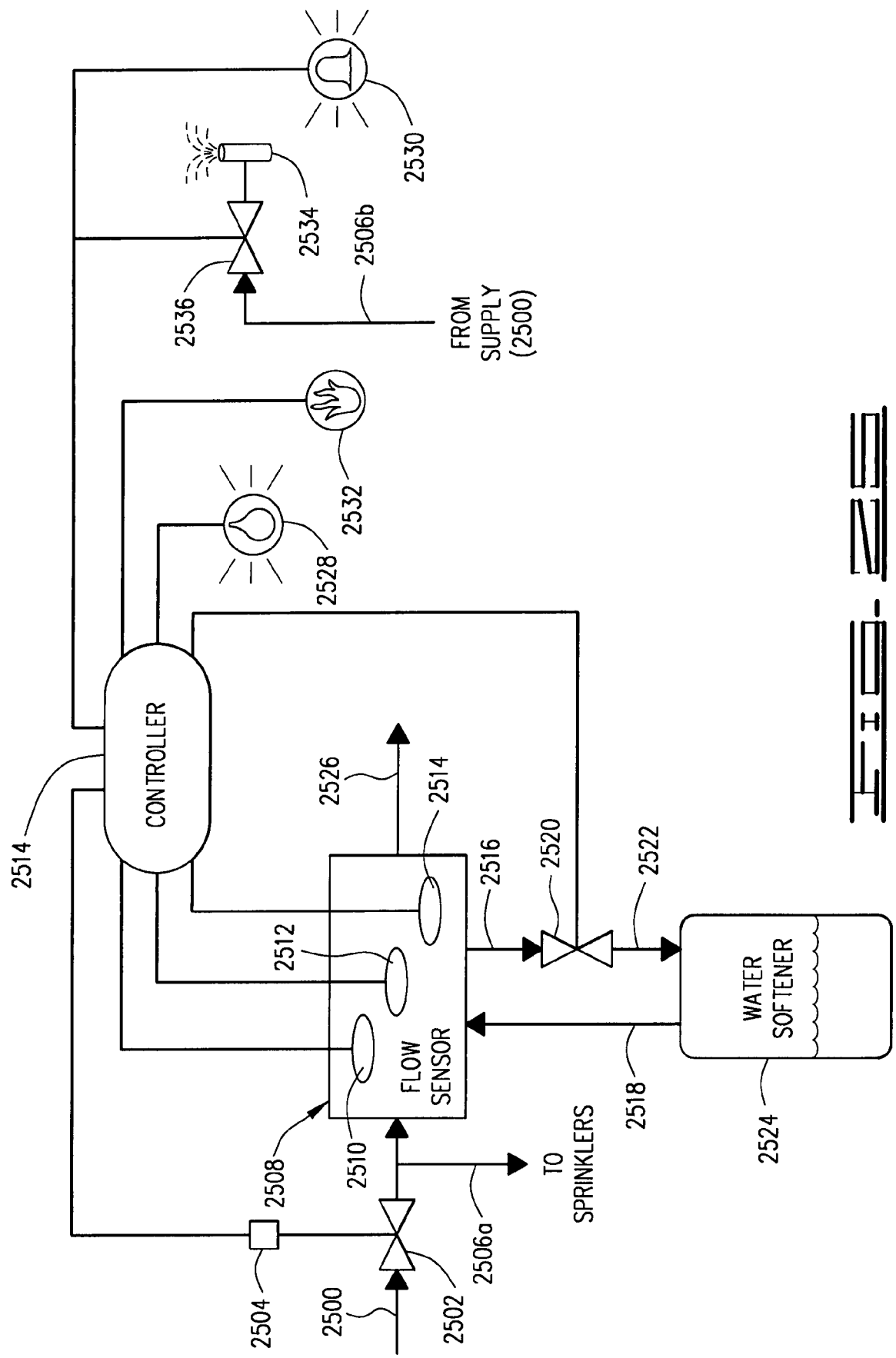
FIG. 25 is a schematic view of a water softener bypass incorporating the principles of the present invention.

A variation on the system shown in FIG. 23 is illustrated in FIG. 25. The system shown in FIG. 25 provides for integration with the controller 2514 which incorporates, what is typically referred to as a home alarm system. Home alarm systems typically have three modes: first, a disarmed mode, where the sensors are not activated; second, an away mode, where the system assumes that no one is home and all of the sensors are activated, including motion detector sensors which may be in the house and which would be alarmed by anyone moving about the house; and third, an alarm at home mode where the external sensors, for example on doors and windows, are activated, but the motion detector type sensors in the house are not activated so that the occupants can move about without activating the alarm. The controller 2514 incorporates these types of features. If it does not incorporate these features, it is at least in communication with a home alarm controller which does incorporate the features. Water enters the system from a supply 2500. It first flows through a main control valve 2502, which has an electronic indicator 2504 in communication with the controller to identify whether the valve is open or closed. In general, since the system will be feeding the fire protection system, it should always be open, and an alarm condition should be created if it is closed inadvertently. That is the purpose of the sensor 2504. After flowing through the main control valve 2502, a portion of the flow will flow through a flow sensor 2508 and another portion may pass outside to yard sprinklers 2506. The flow sensor preferably incorporates three separate detectors. A first detector 2510 is used to activate the water monitoring feature and to allow flow through the system when the water monitoring feature is not activated. A second detector 2512 acts as a "trouble" detector, and activates a valve 2536 to shut off a yard sprinkler. A sprinkler shut off valve 2536 disposed between the supply and the yard sprinklers 2534 in communication with the controller 2514 facilitates the shut off upon detection of a trouble alarm. Also, a circuit may open to shut off lawn sprinklers. A third sensor 2514 activates a full fledged fire alarm, and preferably will alert outside authorities via a dial up connection or the like. Fluid flowing into the flow sensor typically passes out therefrom through a device outlet 2516. As shown, a water softener 2524 is fed by the device outlet 2516. Disposed in the device outlet 2516 is a normally closed valve 2520 which is controlled by the controller 2514. If a demand for flow is detected by the first flow sensor 2510, and the system is not in alarm away mode, the detection of flow demand signals the controller to open the valve 2520. It then passes through a subsequent supply line 2522 through the water softener 2524 back to the flow sensor through a device return line 2518. Thence, the fluid passes out of the flow sensor through the outlet line 2526. A water monitor alarm 2528 is controlled by the controller as is a full fledged fire alarm 2532 and a trouble alarm 2530. When the alarm panel is set for "away mode," valve 2520 is not activated and water flow greater than that needed for an ice maker is forced through a flow sensor 2508 causing a first detector 2510 to operate a water monitor alarm 2528.

Figure 26:
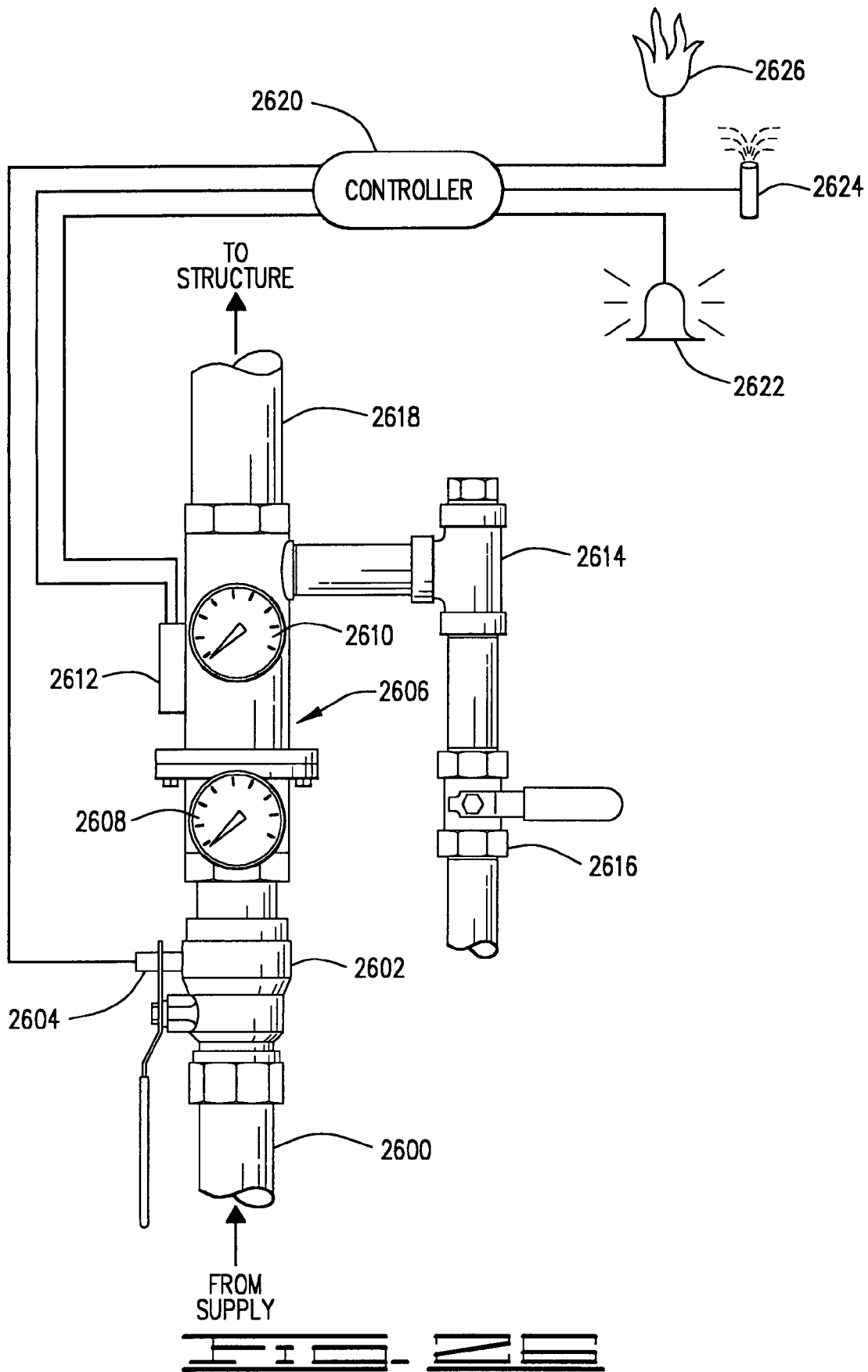
FIG. 26 is a view of a riser assembly incorporating the principles of the present invention.

FIG. 26 shows a riser assembly incorporating the apparatus of the present invention. The riser assembly is intended for use in a multi-purpose piping system or in a stand alone fire protection system in a structure. The riser is fed by a supply 2600. The supply first passes through a supply valve 2602 incorporating a valve tamper switch 2604. The valve tamper switch 2604 is in communication with the controller 2620. The valve should normally be open, and if it is not an indicator is sent to the controller, which will sound a trouble alarm 2622 indicating the valve 2602 is closed. The flow switch 2606 of the present invention is disposed after the supply valve 2602. As shown, the flow switch 2606, has both a pressure gauge 2608 and a flow gauge 2610. The Reed switches for determining flow 2612 are disposed in the outer surface of the flow switch 2606, and they are incorporated within a housing so that they are protected. A drain test connection 2614 is disposed near an outlet end 2618 of the flow switch 2606. The drain test connection feeds a drain test valve 2616. The controller 2620 is in communication with the trouble alarm 2622, a yard sprinkler cut off 2624, and a fire alarm 2626.

Figure 27:
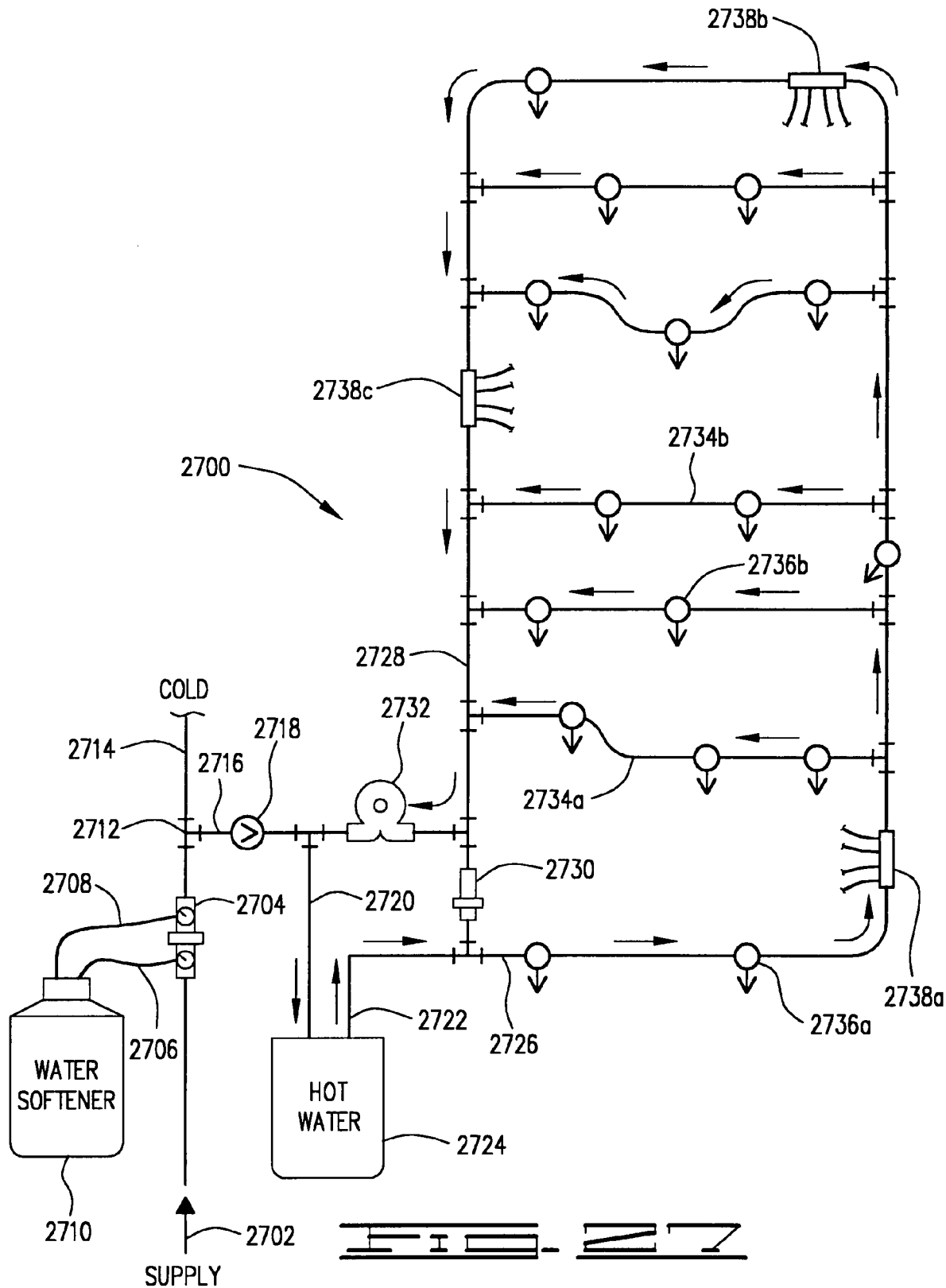
FIG. 27 is a schematic view of a warm water circulating system incorporating the apparatus of the present invention.

FIG. 27 shows an alternative embodiment of a combined domestic supply fire sprinkler system 2700 using a sensor to the present invention. A water supply 2702 is provided. The water first passes through a sensor constructed according to the present invention, of the type shown in FIG. 3, for example. The sensor includes a feed for a device supply line 2706, which supplies a device such as a water softener 2710. After the water passes through the device, it is returned through a device return 2708. If there is no device, such as a water softener, there may simply be a jump over line that passes directly from the supply to the return. After passing through the device, water encounters a "T" 2712, which divides it into a cold side 2714 and a hot side 2716. The hot water side passes through a check 2718, thence into a hot water inlet 2720 through the hot water tank 2724, and back out through a hot water outlet 2722. Hot water then passes through a supply line 2726, to supply at least one fire protection sprinkler 2736, and at least one domestic use via a domestic use manifold 2738. The supply line 2726 connects to a return line 2728, which returns the water to the hot water heater through a recirculation pump 2732, to maintain a minimum desired temperature in the piping. In communication with both the supply line 2726 and the return line 2728 are one or more crossover lines 2734, which are disposed therebetween. The crossover lines 2734 typically are in communication with one or more sprinklers 2736. Also in communication with the return line 2728 is a bypass 2730. The purpose of the bypass 2730 is to allow flow to shortcut some of the supply line piping should a remote point in the return line require additional water supply, for example, to supply a fire protection sprinkler 2736. As an example, the bypass could utilize the device shown in FIG. 13, without the need for an alarm circuit.

FIG. 28 shows a variation of a device similar to the device shown in FIG. 1. In FIG. 28, the orifice plate 2806 is preferably comprised of a conductive material, such as a ferrous material. When a minimal flow allows the spring 2814 to displace the orifice plate 2806 toward the entrance end through the inlet end 2826, the orifice plate 2820 eventually contacts a first contact 2840 and a second contact 2842, which are in electronic communication with a controller or a readout device. This type of contact set up could be utilized in FIG. 24 as a second flow sensor 2440. The spring tension could be set such that if one or more fire sprinklers are alarmed, the orifice plate 2806 will contact the first and second contacts 2840 and 2842, respectively, creating the alarm indicating the fire protection condition has occurred. Also incorporated in the device shown in FIG. 28 are a first and second pressure sensors 2850 and 2852, respectively. The pressure sensors are incorporated within the shoulder 2824, against which the spring rests. They are in electronic communication with the controller or read out. As flow increased through the sensor, the pressure against the pressure sensors 2850 and 2852, respectively, increases proportionate to the increase of flow rate. Thus, the reading from the pressure sensors is directly related to the flow rate through the device.

Several additional contacts are shown disposed along an interior portion of the annular housing 2802. A contact 2844 is disposed closest to the inlet end, sensor 2848 is disposed closest to the outlet end 2828, and sensor 2846 is disposed therebetween. As the conductive plate is displaced by flow towards the outlet end 2828, it successively contacts sensor 2844, then sensor 2846, followed by sensor 2848. The conductive plate 2828 completes a circuit between sensors 2844a and sensor 2844b, and similar for sensor 2846 and sensor 2848. Thus, the position of the plate 2820 can be determined by which sensors it is in contact with. As shown, the sensors are point contacts. However, they could also be sectional contacts. That is, an entire linear portion of the interior of the annular housing 2802 could be lined with a contact with an insulating break between that section and the next contact portion lining and interior part of the annular housing 2802. Thus, the orifice plate 2806 would be in constant contact with at least one of the sensors lining an interior portion of the annular housing.

There are many other schemes and sensor types which could be used to indicate the flow through the device using either the relative position of the orifice plate or the pressure created by displacement of the spring. All these types of devices are intended to be incorporated with the spirit and scope of the invention. The examples and configurations described above are intended by way of illustration, not by way of limitation. The basic concept of the moving orifice plate can be incorporated in a myriad of configurations of flow sensors, and is useful for not only fire protection, but also many other industries as has been noted previously.

OPERATION

The operation of various apparatus and systems utilizing the apparatus disclosed in the present invention will now be discussed. FIG. 1 is a simple flow sensor. Water enters through the inlet end 126. As the flow increases, it tends to bias the moving orifice plate 106 towards the outlet end 128 overcoming the resistance of the spring 114. As the moving orifice plate is displaced toward the outlet end, the magnet 112 comes closer to the Reed switch 116. At some point, the Reed switch would either open or close depending on whether its a normally open or normally closed Reed switch. This creates a signal change which can be sensed by the leads attached to the Reed switch. A user can read the upstream pressure on a pressure gauge 130, and can read the flow through the device as measured by the flow gauge 132. The flow gauge 132 is calibrated for the moving orifice plate 106, so that the pressure therein is proportional to the flow rate through the orifice plate.

The device in FIG. 2 is similar to the operation of the device is FIG. 1. However, as the moving orifice plate 210 is displaced backwardly, it enters the expanding section 206. In the expanding section, in addition to flow through the opening 212 fluid can flow around a periphery of the moving orifice plate in the expanding section 206, allowing additional flow capacity through the device.

In contrast to the devices shown in FIGS. 1 and 2, the device in FIG. 3 does not allow flow at any pressure differential between the inlet 306 and the outlet 308. Rather, a minimum pressure drop, proportional to the orifice spring 338 must be developed before the moving orifice plate 330 will be displaced sufficiently towards the outlet 308 so that the orifice plate clears the bullet rod 314, allowing fluid to flow through an opening defined in the orifice plate 330. This differential pressure requirement before flow can pass through the device shown in FIG. 3 requires flow to typically pass through the device outlet 350, through a device, such as a water softener, and back into the device through the device inlet port 352. This feature allows the device shown in FIG. 3 to function as a bypass mechanism. That is, typically, flow is directed through the device, but if a sufficiently large pressure drop is developed, indicating that the flow capacity of the device is being overcome, fluid can bypass through the moving orifice plate 330 once it is displaced past the bullet rod 314.

The other operational feature for the device shown in FIG. 3 in its operation is a double check. With a device inlet and outlet ports included with the device, there also have to be checks on those lines to ensure the operation of the double check, otherwise the fluid could simply bypass the double check mechanism passing back through the device. When fluid tends to flow in an undesired direction, that is from the outlet 308 to the inlet 306, a moving check 318 is displaced both by the action of the fluid and by the action of the check spring 324 toward the inlet end. The check o-ring 320 seats against a corresponding check shoulder seat 336, preventing fluid flow. The second check is provided by the moving orifice plate 330, and two o-rings, an outer o-ring 332 and an inner o-ring 334, which seat against the bullet port 312, providing a second check. The seating is provided by both the force of the fluid in addition to the force of the orifice spring 338. The operation of the device shown in FIG. 13 is very similar to that of the device shown in FIG. 3. However, since there is no device outlet and inlet lines, there is no need for a check on those lines. Further, the orifice plate/magnet 1330 serves to function both the magnet and the orifice plate, and is coated with a rubber/polymeric material to serve as a seating material itself. That is, the rubber/polymer on the moving orifice plate/magnet 1330 seats against the outer sealing surface 1332 and the inner sealing surface 1334 of the bullet port 1312.

Though the device shown in FIG. 14 is structurally different from the devices shown in FIGS. 3 and 13, its operation is similar. When fluid enters the device through the inlet 1406, it encounters the first internal check 1412. No fluid can pass through the first internal check 1412 until a sufficient pressure drop is developed to displace the first internal check 1412 backwardly, against the force of the first spring so that the check o-ring 1426 is displaced past the first cylinder portion 1420. Once the fluid is displaced past the first cylinder portion, fluid can flow out or around the first check o-ring 1426. The operation of the second o-ring check is the same. There is no flow until the second internal check 1414 is displace sufficiently backward where fluid can flow out around the second check o-ring 1428. Magnets disposed on both the first and second checks, 1430 and 1432 respectively, can activate Reed switches 1440 and 1442 respectively, on an external surface of the sensor. The springs 1436 and 1438 can be set to different tensions. Thus, the first and second internal checks, 1412 and 1414, might be displaced different distances by the same pressure differential. Thus, the first internal check 1412 and its corresponding magnet 1430 could function as a trouble alarm, while the second internal check 1414 and its corresponding magnet 1432 could serve as a fire alarm, not alarming until a much larger pressure differential is developed, indicating a larger flow.

The operation of the device shown in FIG. 22 is similar to the devices discussed above, but it has some substantial variations. The main feature not described in the previous apparatus which is included in FIG. 22, is the vane 2210. The vane can be externally adjusted to increase the pressure drop thereacross. As the vane is adjusted to close off the main flow path 2206, the pressure drop across the device increases. This tends to bias the moving magnet 2216 towards the outlet end 2204 overcoming the pressure of the spring 2218. Once the pressure drop across the device becomes sufficient, the magnet 2216 is displaced back far enough so that fluid can flow through the bypass flow path 2208 and out through the bypass outlet 2222, bypassing the external device, such as a water softener. The magnet can be used to activate an external Reed switch 2224 for purposes such as a trouble alarm, fire alarm, or the like. In addition, should the device become blocked, the alternate flow path 2208 allows fluid to continue to flow therethrough, preventing a blockage.

In operation the system illustrated in FIG. 23 works as follows. Water flows into the system from a water supply 2300 to a flow sensor 2301a. Typically, a flow sensor 2301a diverts water through an inlet softener line 2304 to the water softener for treatment, however, when a demand exceeds the ability of water to flow through the water softener, a bypass mechanism incorporated in the flow sensor 2301a allows water to short circuit, and not pass primarily through the water softener, but flow through to the first pipe section 2308. Similarly, the flow sensor 2301b receives water from the second pipe section 2312. Typically, water is diverted downward through the inlet heater line 2316 through a water heater for heating, back up through the outlet heater line 2318, and then on to the multi-purpose pipe section 2320. However, when the demand for water exceeds the ability of water to flow through the water heater, a bypass mechanism allows water to flow from a second pipe section 2312 through the flow sensor 2301 to the multi-purpose pipe section 2320.

The bypass mechanism of the flow sensor 2301 operates without the need for any electronics or any external sensors. Rather, an orifice plate has an orifice, which is adapted to closely receive a bullet rod. Once the orifice has received the bullet rod, water cannot pass there through. A spring is adapted to bias the orifice plate towards a bullet port. Therefore, in a no-flow condition, the orifice plate is held against the bullet port by the spring. However, as water begins to flow around the bypass mechanism through a device, a pressure drop caused by a restriction is developed between the main inlet and the main outlet, which forces the orifice plate to compress the spring backwardly towards the main outlet. If the pressure difference becomes large enough, the orifice plate is displaced backwardly far enough so that the orifice plate clears the bullet rod and water can flow through the orifice.

A magnet is received against the orifice and seated on a magnet seat. As shown in FIG. 4, the magnet is on the inlet side of the orifice, but it may also be on the outlet side. The magnet moves in cooperation with the orifice plate. The magnetic field created thereby will operate a trouble Reed switch 2356 when it becomes in a close enough proximity thereto, and subsequently a fire Reed switch 2358 as it continues to move backwardly. By the time the magnet approaches the fire Reed switch 2358 close enough to activate it, it has cleared the bullet rod, and water is flowing through the bypass means.

Normally, open Reed switches complete a circuit to send a signal as they are activated. The trouble Reed switch 2356 preferably activates an alarm, which only sounds in the structure where the system is located. This alerts the residents that the water usage is approaching the fire protection level, and that if they want to avoid a fire alarm they need to reduce their water usage. The fire Reed switch 2358 preferably activates a system with remote notification. That is, when the fire Reed switch 2358 is activated, a call is made to a fire department or other monitoring authority, so that they can respond to the fire condition which has apparently been created in the structure. The flow required to activate the fire Reed switch 2358 should not occur except in circumstances where a fire sprinkler has activated in response to a fire. The Parent Applications discuss the different flow regimes between typical domestic uses and flow regimes required for fire protection. It is important to calibrate the location of the Reed switches, which can slide either toward the outlet or away from the outlet by loosening the Reed switch clips. The calibration of this system is described in the Parent Applications.

A passive pump 2324 only operates when water flows to the multi-purpose pipe section 2320. Since this is a multi-purpose pipe section, water will flow through the multi-purpose pipe section 2320 on a regular basis to supply, for example, shower heads 2322 or faucets 2334. In addition, where a pump 2344 is provided to maintain re-circulation to maintain a minimum temperature, the pump 2344 will also provide flow through the multi-purpose pipe section 2320. When there is flow through the multi-purpose pipe section 2320 there will be velocity head associated therewith. The passive pump 2324 takes advantage of this velocity head. As water passes into the chamber, a differential pressure is created by the configuration of the inlet and the outlet such that water is drawn into the inlet and pulled out of the outlet opening. A vacuum of sort is created by facing the outlet opening away from the inlet. Thus, the velocity head is used to create a flow through the supply and return lines, 2330 and 2332, respectively.

However, when a fire sprinkler head 2328 activates, the water demand will be so great that water will be supplied to the head fitting through both the head supply and head return lines 2330 and 2332, respectively. That is, both lines operate as supply lines when a fire sprinkler operates. It has the advantage of allowing small supply lines to be used than would be required if only one line were in place. In addition, there is a redundancy because even if a plug were to develop in one of the lines, the other line would probably not be plugged and would still provide water to the sprinkler head.

The operation of the return leg flow sensor 2354, in many respects, is like the flow sensor 2301. However, it does not have the inlet or outlet ports for devices such as water softeners nor need to have an alarm output. The only purpose of the return leg flow sensor 2354 is to allow flow there through when the differential pressure from the inlet to the outlet increases to an extent indicating that additional water flow needs to be allowed. Again, when the differential pressure rises to that level, the orifice plate is displaced to pass the end of the bullet rod allowing flow through the orifice. Internally, the flow sensor 2301 is attached both to the first pipe section 2308 and to the tail end of the multi-purpose pipe section 2320. It is conceivable that where there are multiple sprinkler heads attached to the multi-purpose pipe section 2320, during a fire, there may less than sufficient water to feed the sprinkler heads toward the end of the multi-purpose pipe section 2320. Therefore, additional water would be allowed to pass through the return leg flow sensor 2354 feeding these sprinklers at or near the end of the multi-purpose pipe section 2320. This additional water supply would assist these sprinklers in doing their job of suppressing a fire.

In operation the system of FIG. 24 is different from the system of FIG. 23. This difference is largely due to the fact that, for example, for a 10,000 square foot building, approximately one hundred gallons per minute of total flow is required to operate the heat pump circulating system. This large flow exceeds the flow of a typical sprinkler head, and would not allow it to differentiate the flow as is possible with the residential system. Therefore, the system of FIG. 24 compares the flow as measured through a first flow sensor 2416 to flow as measured through a second flow sensor 2440. If the differential between the measured flow indicates that a fire sprinkler is activated, the controller 2418 activates a fire alarm 2420. This alarm may have two stages, a first stage trouble alarm, and a second stage fire alarm.

In operation as a heater/air conditioner, fluid is re-circulated by the pump 2412 through a supply line 2414 and through the various heat exchangers 2434 which distribute the heated or cooled air throughout the structure. Once it has passed through the heat exchangers, it is returned through the return line 2438, to either be heated or cooled again by the heat rejector 2408 or the heater 2410, and is circulated through the system again through the pump 2412. Fire sprinklers 2430 are disposed on the lines that pass through the heat exchangers 2434. These fire sprinklers are supplied either by the supply line 2414 or by a bypass leg 2442, with a check valve to ensure that in regular operation the fluid does not backflow through the bypass leg from the supply line 2414 to the return line 2438, circumventing the heat exchangers 2434.

To calibrate the system, the operation of the fire sprinkler system is operated with either the supply side test valve 2448 or the return test valve 2452. The supply test valve 2448 allows the simulation of the operation of a fire sprinkler on the supply side, and the return test valve 2452 allows the simulation of the operation of a fire sprinkler on the return side.

The operation of the system illustrated in FIG. 25 illustrates the use of an electronic controller in cooperation with the flow sensor having three stages of detection. As fluid flows through the flow sensor, at some point it reaches a flow great enough to activate a first detector 2510. This first detector sends a signal to the controller, which activates the normally closed valve 2520 to open. This allows flow through the water softener into the system. An increased flow will activate the second detector 2512, which communicates this situation to the controller 2514 and activates a trouble alarm 2530. At this point, in a mode where the controller and/or the home security system are in the alarm away mode, a demand for water will, instead of activating the valve 2520 to open, send an water alarm 2528 indicating that there is either a leak or an unauthorized demand for water. This may first activate a trouble-type alarm, and subsequently may notify outside officials, such as a fire department or a monitoring agency, should the water monitor remain in place for a sufficient length of time.

The operation of the riser assembly incorporating the flow sensor of the present invention is relatively straight forward. The operation of the flow sensor 2606 is the same as previously described above. However, the riser assembly is provided either pre-assembled or in a package with simple assembly instructions. It preferably includes substantially all of the piping and sensor components shown in FIG. 26 (excluding the controller). A tamper switch 2604 on a valve 2602 sends an alarm signal to the controller if the valve 2602, which should normally be open, is inadvertently closed. The flow sensors 2606 includes an outlet port or attachment of the drain test connection 2614 and test valve 2616 incorporated thereon. Once connected, the test valve 2616 is normally closed and the valve 2602 is normally open to allow flow therethrough, which it is being measured in the flow sensor 2606.

The operation of the device shown in FIG. 27 is very much like the operation of the device shown in FIG. 23. In practice, it is much simpler to install because the use of manifolds 2738 minimize the amount of piping that has to be run to specifically supply all the domestic uses, such as a shower head 2322 and faucets 2334, and the like.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

What I claim is:

1. A system for distinguishing between a fire sprinkler water flow and a domestic use water flow comprising:
   a. a multipurpose piping system coupled to at least one domestic use device and at least one fire sprinkler; and
   b. means for distinguishing between the fire sprinkler water flow and the domestic use water flow through the multipurpose piping system.

2. The system of claim 1, the means for distinguishing including sending an alarm signal when a water flow through the multipurpose piping system exceeds the domestic use water flow.

3. The system of claim 2, further comprising a pressure gauge communicating with the multipurpose piping system.

4. The system of claim 2, the means for distinguishing including communicating with a telephone-based remote notification system.

5. The system of claim 1, further comprising a water softener and a water softener bypass device coupled to the means for distinguishing.

6. A method of detecting a water flow in a multipurpose piping system, the multipurpose piping system having common piping for a fire sprinkler and a domestic use device, the method comprising:
   a. supplying water under pressure to the multipurpose piping system; and
   b. using a means for distinguishing to distinguish between a fire suppression flow and a domestic flow in the multipurpose piping system.

7. The method of claim 6, further comprising sending an alarm signal when the water flow exceeds a maximum domestic use.

8. The method of claim 7, further comprising measuring a water pressure with a pressure gauge in communication with the multipurpose piping system.

9. The method of claim 8, the means for distinguishing being in communication with a telephone-based remote notification system.

10. The apparatus method of claim 6, the system including further comprising diverting the water flow to bypass a water softener and a means for bypassing the water softener to provide additional supply for a fire sprinkler water flow.

11. A device, comprising:
    means for detecting a flow within a multipurpose piping system; and
    means for creating an alarm output when the flow within the multipurpose piping system is a fire protection flow and greater than a maximum domestic flow.

12. The device of claim 11, the maximum domestic flow having at least one of a K value greater than 3.3, a K value between 3.3 and 4.3, and a K value less than 4.3.

13. The device of claim 11, the alarm output being provided to at least one of a visible alarm, an audible alarm, a modem, a communication system, a fire department, an emergency contact, and a cutoff valve.

14. A multipurpose piping system communicating with a water supply, the multipurpose piping system comprising;
    a. an inflow end coupled to the water supply;
    b. a domestic use device mounted on a domestic use end of the multipurpose piping system to provide a water flow at a domestic flow;
    c. a fire sprinkler mounted on a fire protection end of the multipurpose piping system to provide the water flow at a fire protection flow; and
    d. a sensor monitoring the water flow, the sensor distinguishing between the domestic flow and the fire protection flow.

15. The device of claim 14, the domestic flow having at least one of a K value less than 3.3, a K value between 3.3 and 4.3, and a K value less than 4.3.

16. The device of claim 14, the fire protection flow having at least one of a K value greater than 3.3, a K value between 3.3 and 4.3, and a K value greater than 4.3.

17. The system of claim 14, the sensor providing a signal to at least one of a visible alarm, an audible alarm, a modem, a communication system, a fire department, an emergency contact, and a cutoff valve.

18. A method, comprising:
    a. detecting a flow within a multipurpose piping system;
    b. maintaining a non-alarm condition when the flow is less than a maximum domestic flow; and
    c. activating an alarm output when the flow is a fire protection flow that is greater than the maximum domestic flow.

19. A method, comprising:
a. sensing a flow in a multipurpose piping system at a point between an inflow end of the multipurpose piping system connected to a water supply and a plurality of outflow ends of the multipurpose piping system connected to a domestic use device and a fire sprinkler; and
b. distinguishing between a first condition in which the flow is a domestic flow and a second condition in which the flow is a fire protection flow.

* * * * *